United States Patent
Rho et al.

(10) Patent No.: US 10,429,722 B2
(45) Date of Patent: Oct. 1, 2019

(54) CAMERA LENS ASSEMBLY

(71) Applicant: Samsung Electronics Co., Ltd., Gyeonggi-do (KR)

(72) Inventors: Hyung Jin Rho, Gyeonggi-do (KR); Se Won Kim, Gyeonggi-do (KR); Hyun Ho Yu, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 72 days.

(21) Appl. No.: 15/671,268

(22) Filed: Aug. 8, 2017

(65) Prior Publication Data

US 2018/0067379 A1    Mar. 8, 2018

(30) Foreign Application Priority Data

Sep. 7, 2016   (KR) .................. 10-2016-0115307

(51) Int. Cl.
*G03B 13/36*     (2006.01)
*G02B 27/64*     (2006.01)
(Continued)

(52) U.S. Cl.
CPC ........... *G03B 13/36* (2013.01); *G02B 27/646* (2013.01); *G03B 3/10* (2013.01); *G03B 5/02* (2013.01); *G03B 19/22* (2013.01); *H04N 5/2252* (2013.01); *H04N 5/2253* (2013.01); *H04N 5/2254* (2013.01); *H04N 5/2257* (2013.01); *H04N 5/23287* (2013.01); *H04N 5/247* (2013.01); *G03B 2205/0015* (2013.01); *G03B 2205/0069* (2013.01); *G03B 2217/002* (2013.01)

(58) Field of Classification Search
CPC ......... G03B 13/36; G03B 3/10; G03B 19/22; G03B 5/02; G03B 2205/0069; G03B 2205/0015; G03B 2217/002; H04N 5/2257; H04N 5/2252; H04N 5/247; H04N 5/23264; H04N 5/2254; H04N 5/2253; G02B 27/646
See application file for complete search history.

(56) References Cited

U.S. PATENT DOCUMENTS 8,743,179 B2    6/2014  Ryu et al.
2011/0169920 A1  7/2011  Ryu et al.
(Continued)

FOREIGN PATENT DOCUMENTS

KR       10-0932175 B1    12/2009
KR    10-2014-0144126 A   12/2014
(Continued)

OTHER PUBLICATIONS

European Search Report; dated Jan. 30, 2018.
European Search Report dated May 11, 2018.

*Primary Examiner* — Timothy J Henn
(74) *Attorney, Agent, or Firm* — Cha & Reiter, LLC.

(57) ABSTRACT

A dual lens assembly is disclosed herein, including a plurality of lens group units disposed as to face a same direction, a plurality of driving modules provided respectively on first side surfaces of each of the plurality of lens group units to move each of the plurality of lens group units along a direction of a respective optical axis of each of the plurality of lens group units, or move each of the plurality of lens group units along a direction perpendicular to the respective optical axis of each of the plurality of lens group units, and a housing at least partially enclosing at least some of the plurality of lens group units and the plurality of driving modules.

17 Claims, 20 Drawing Sheets

(51) Int. Cl.
*H04N 5/225* (2006.01)
*G03B 3/10* (2006.01)
*G03B 5/02* (2006.01)
*G03B 19/22* (2006.01)
*H04N 5/247* (2006.01)
*H04N 5/232* (2006.01)

(56) References Cited

U.S. PATENT DOCUMENTS

| | | |
|---|---|---|
| 2013/0141541 A1 | 6/2013 | Jung et al. |
| 2014/0362284 A1* | 12/2014 | Shin ................ G02B 27/646 |
| | | 348/373 |
| 2015/0346453 A1* | 12/2015 | Cheong ............. H04N 5/2257 |
| | | 359/824 |
| 2016/0341975 A1* | 11/2016 | Kim ................. G02B 27/646 |
| 2017/0094187 A1 | 3/2017 | Sharma et al. |
| 2017/0315376 A1* | 11/2017 | Hu .................. G02B 27/646 |
| 2017/0336699 A1* | 11/2017 | Hu ...................... G02B 7/09 |
| 2018/0027185 A1* | 1/2018 | Miller .............. H04N 5/23287 |
| | | 348/208.11 |
| 2018/0031860 A1* | 2/2018 | Bachar ................ G02B 13/003 |
| 2018/0100984 A1* | 4/2018 | Wu .................... G02B 7/023 |
| 2018/0275368 A1* | 9/2018 | Lee ................... H04N 5/2253 |

FOREIGN PATENT DOCUMENTS

| | | |
|---|---|---|
| KR | 10-2015-0113675 A | 10/2015 |
| WO | 2017/058409 A1 | 4/2017 |

\* cited by examiner

CAMERA LENS ASSEMBLY

CLAIM OF PRIORITY

This application claims the benefit under 35 U.S.C. § 119(a) of a Korean patent application filed on Sep. 7, 2016 in the Korean Intellectual Property Office and assigned Serial number 10-2016-0115307, the entire disclosure of which is hereby incorporated by reference.

TECHNICAL FIELD

The present disclosure relates to a camera lens assembly including a dual camera.

BACKGROUND

Much effort has been invested in improving the performance of a dual camera as well as minimizing a size of a camera lens assembly when the camera lens assembly is mounted on an electronic device. For example, camera improvements include an anti-shake function and an automatic focusing.

The camera lens assembly may include a lens unit and a carrier unit for fixing the lens unit. A driving unit moves the lens unit in at least one of upwards, downwards, leftwards, and rightwards directions relative to the carrier unit.

The camera lens assembly may be a dual camera lens assembly, to which a second lens (e.g., a wide lens or a tele lens) is applied. The dual camera lens assembly may prevent decentering and occlusion disparities when the distance between two lenses is small. At least one of the automatic focusing and the anti-shake functions may be applied to the camera lens assembly. At least one driving unit may be applied to each of the lens assemblies of the dual camera lens assembly. However, because the driving units are driven by using magnetic fields, magnetic interference may occur between the driving units when the distance between the respective lenses is small.

SUMMARY

Aspects of the present disclosure are to address at least the above-mentioned problems and to provide benefits made clear by the embodiments described below. Accordingly, an aspect of the present disclosure is to provide improve a magnetic interference of a camera lens assembly that provides at least one of au automatic focusing function and anti-shake functionality.

In accordance with an aspect of the present disclosure, there is provided an electronic device including a first camera module, and a second camera module, wherein the first camera module includes a first image sensor, a first lens unit formed on the first image sensor and including a first side surface, a second side surface, a third side surface, and a fourth side surface, a first driving unit disposed on the first side surface and configured to drive the first lens unit along an optical axis of the first lens unit, and a second driving unit disposed on the second side surface and the third side surface and configured to drive the first lens unit in a direction perpendicular to the optical axis of the first lens unit, wherein the second camera module includes a second image sensor, a second lens unit formed on the second image sensor and including a fifth side surface, a sixth side surface, a seventh side surface, and an eighth side surface, a third driving unit located on the fifth side surface and configured to drive the second lens unit along an optical axis of the second lens unit, and a fourth driving unit disposed on the sixth side surface and the seventh side surface and configured to drive the second lens unit in a direction perpendicular to the optical axis of the second lens unit, and wherein a side surface of the first camera module corresponding to the fourth side surface of the first lens unit is adjacent to a side surface of the second camera module corresponding to the eighth side surface of the second lens unit, and the driving units for driving the first lens unit and the second lens unit are not disposed on or otherwise disposed away from the fourth side surface and the eighth side surface.

In accordance with another aspect of the present disclosure, there is provided an electronic device including a plurality of lens group units configured to photograph a subject in the same direction or otherwise disposed as to face a same direction, a plurality of driving modules provided respectively on first side surfaces of each of the plurality of lens group units to move each of the plurality of lens group units along a direction of a respective optical axis of each of the plurality of lens group units, or move each of the plurality of lens group units along a direction perpendicular to the respective optical axis of each of the plurality of lens group units, and a housing at least partially enclosing at least some of the plurality of lens group units and the plurality of driving modules.

Other aspects, benefits, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the present disclosure.

Figure 1A:
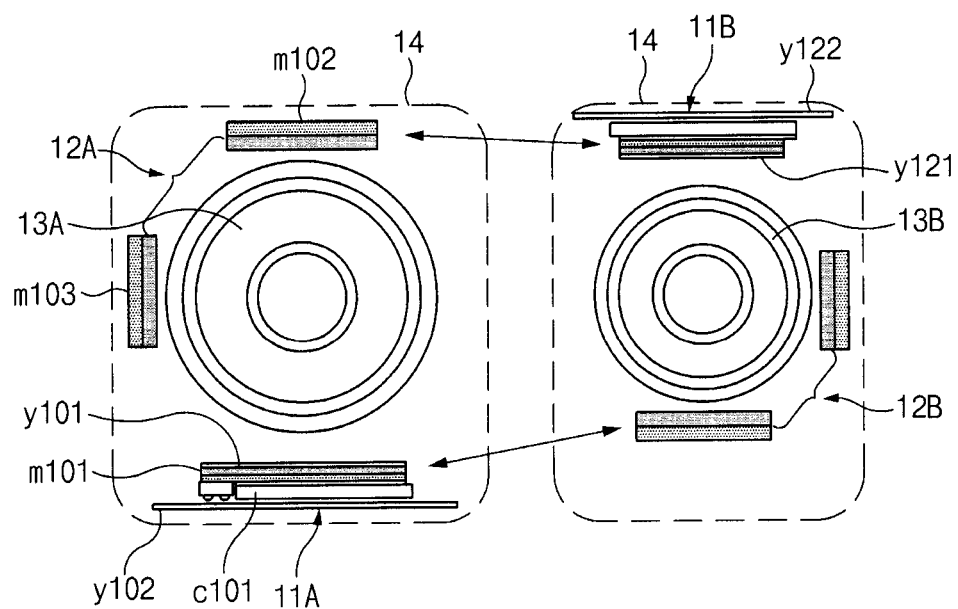
FIG. 1A and FIG. 1B are views illustrating a dual camera lens assembly when viewed from the top according to various embodiments of the present disclosure.
Figure 1B:
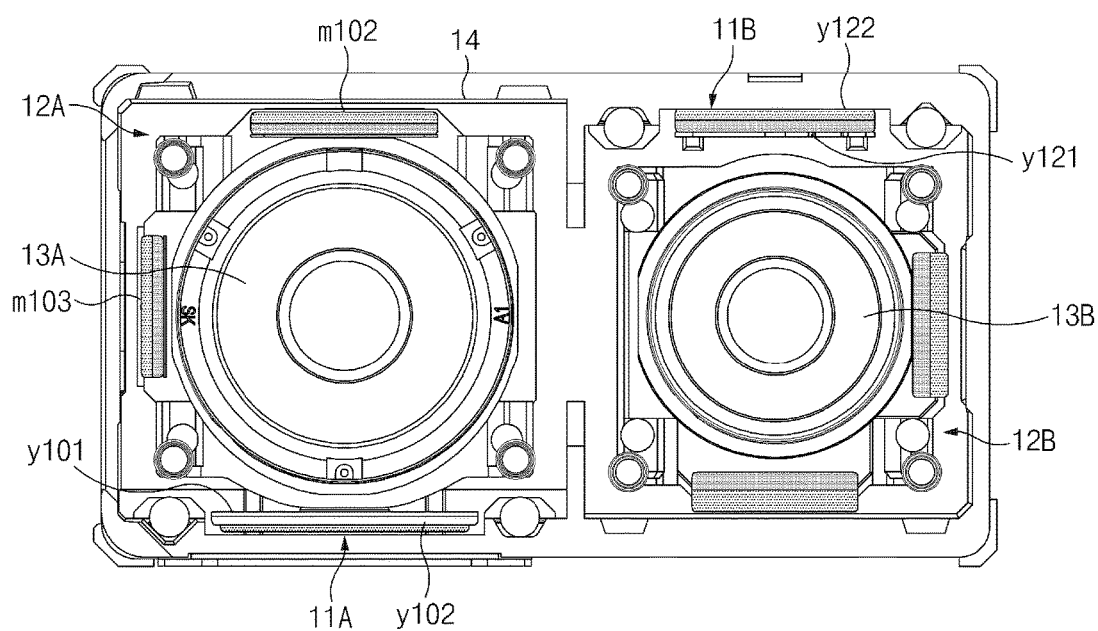
Figure 1C:
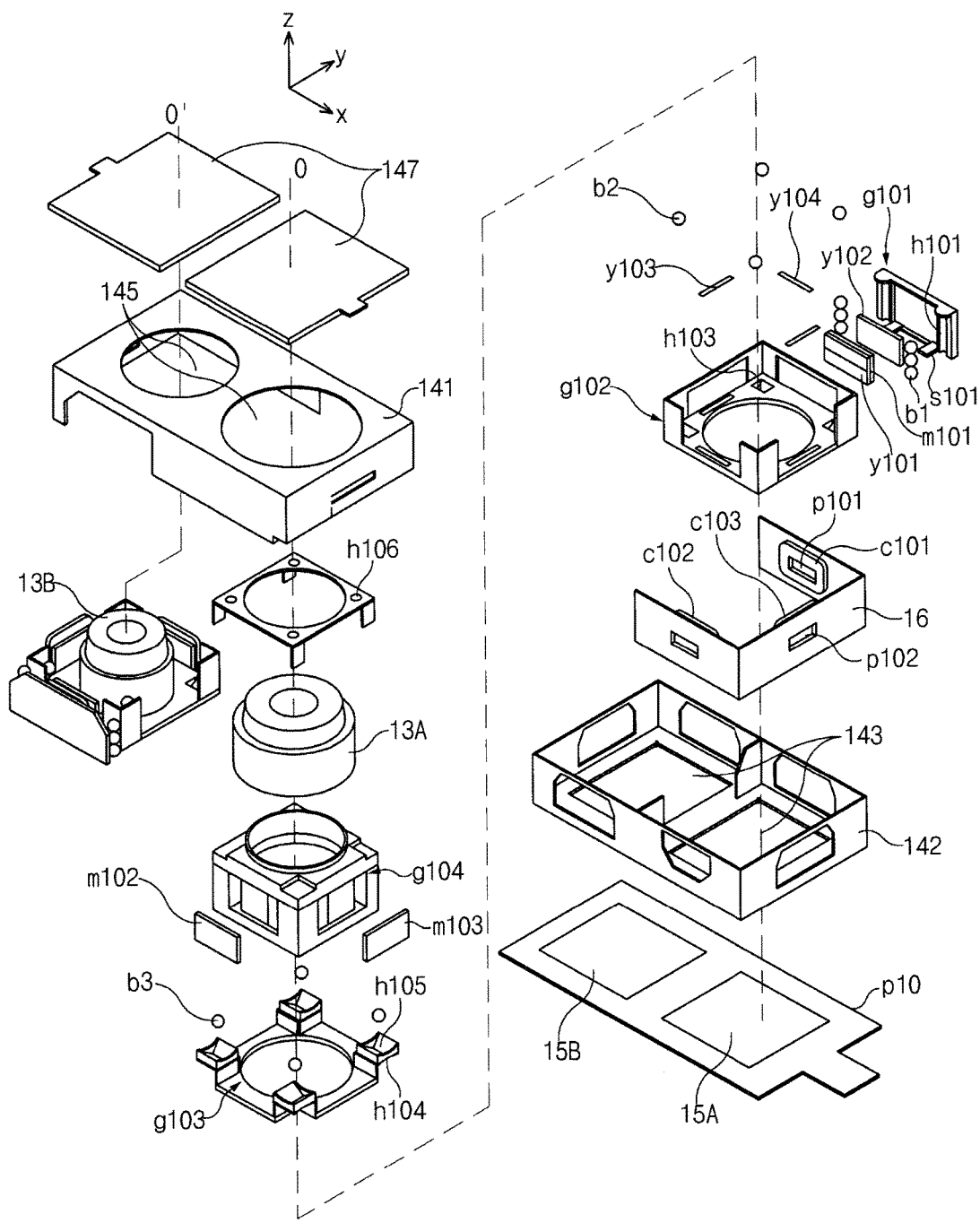
FIG. 1C is an exploded view of the dual camera lens assembly according to various embodiments of the present disclosure.
Figure 1D:
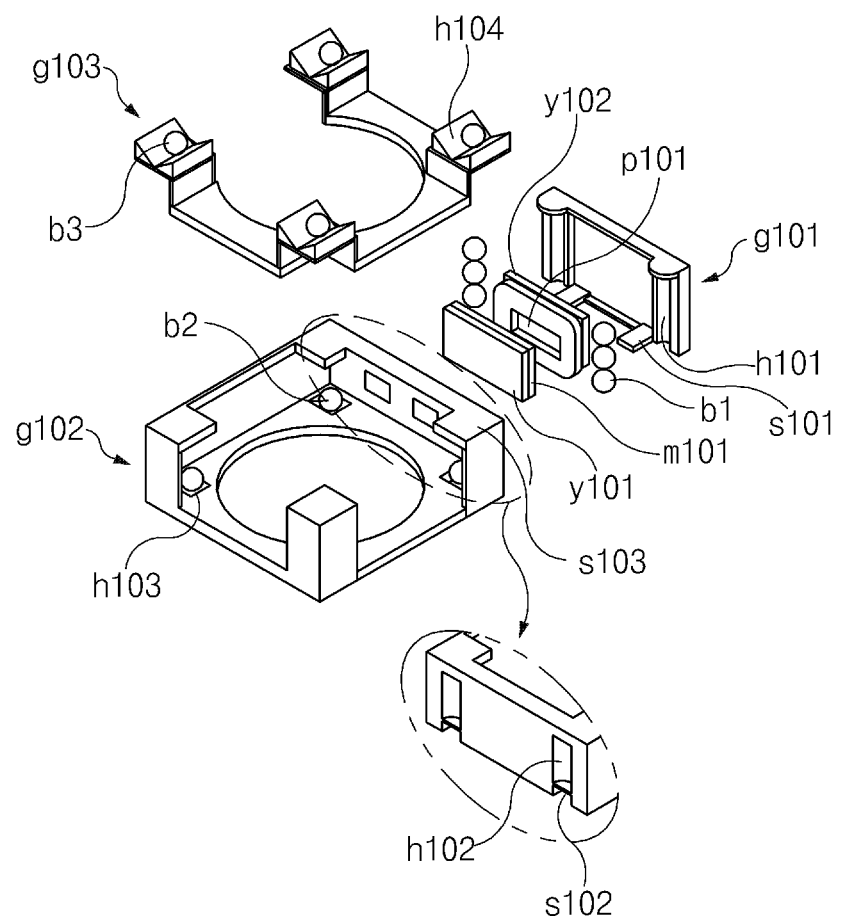
FIG. 1D is a view illustrating a side surface of a second guide member according to various embodiments of the present disclosure.

FIGS. 1A and 1B are views illustrating a dual camera lens assembly when viewed from the top according to a various embodiments of the present disclosure. FIG. 1C is an exploded view of the dual camera lens assembly according to various embodiments of the present disclosure. FIG. 1D is a view illustrating a side surface of a second guide member according to various embodiments of the present disclosure.

As illustrated in FIGS. 1A to 1D, the camera lens assembly 10 according to the various embodiments of the present disclosure may include a housing 14, a lens group unit-A 13A, a lens group unit-B 13B, an AF driving unit-A 11A, an AF driving unit-B 11B, an OIS driving unit-A 12A, and an OIS driving unit-B 12B.

According to the various embodiments of the present disclosure, the housing 14 may accommodate the lens group unit-A 13A, the lens group unit-B 13B, the AF driving unit-A 11A, the AF driving unit-B 11B, the OIS driving unit 12A, or the OIS driving unit-B 12B. Because the locations and the sizes of the AF driving unit-A 11A and the AF driving unit-B 11B may be slightly different but the configurations thereof may be the same or similar in the various embodiments, the AF driving unit-A 11A will be mainly described in the following. Similarly, because the locations and the sizes of the OIS driving unit-A 12A and the OIS driving unit-B 12B may be slightly different but the configurations thereof may be the same or similar in the various embodiments, the OIS driving unit-A 12A will be mainly described in the following. In a description of the components of the lens group unit-A 13A, the AF driving unit-A 11A, and the OIS driving unit-A 12A, it is noted that some numbering (e.g., A) of some reference numerals may be omitted.

According to the various embodiments of the present disclosure, the housing 14 (see FIG. 1C) may be largely classified into a lower housing 142 and an upper housing 141. The lower housing 142 may be coupled to the upper housing 141 while at least a portion of the lens group unit-A 13A and the lens group unit-B 13B, the AF driving unit-A 11A, the AF driving unit-B 11B, the OIS driving unit-A 12A, and the OIS driving unit-B 12B are accommodated in the interior of the lower housing 142, on a printed circuit board p10 on which at least a portion of an image sensor-A 15A and an image sensor-B 15B is mounted.

According to the various embodiments of the present disclosure, the upper housing 141 may have a hexahedral shape, a lower surface of which is open. The upper housing 141 may include a plurality of first openings 145 on an upper surface thereof. Each of the first openings 145 may have a shape corresponding to circumferences (e.g., a circle) of the lens group unit-A 13A and the lens-group unit-B 13B. The upper housing 141 may be coupled to the lower housing 142 while a plurality of side surfaces of the upper housing 141 surround the side surfaces of the lower housing 142.

According to the various embodiments of the present disclosure, the lower housing 142 may have a hexahedral shape, an upper surface of which is opened as a whole. A lower surface of the lower housing 142 may include at least one second opening 143. In the various embodiments, the plurality of image sensors (15A and 15B) (hereinafter, referred to as 15) may be mounted on the printed circuit board p10, and may be connected to an electronic device, on which the camera lens assembly 10 is mounted, for example, an imaging device such as a digital camera, a mobile communication terminal, or a tablet PC. The printed circuit board p10, for example, may be one board, on which all the plurality of image sensors 15 are mounted. The printed circuit board p10 may be a plurality of boards, on which the plurality of image sensors 15 are mounted, respectively.

According to the various embodiments of the present disclosure, at least a portion of at least two first side surfaces of the lower housing 142 may be opened. For example, a first side surface of each of the lower housings 142 may be a side surface, on which the plurality of AF driving units 11A and 11B are installed. In the various embodiments, a magnetic force of a magnet (e.g., m101) of each of the AF driving units 11 may be lower than that of the OIS driving unit 12. The magnets (e.g., m101) of the AF driving units 11 may be provided at a location at which there is no magnetic interference between the magnets m102 and m103 of the plurality of OIS driving units 12 or a magnetic interference between the magnets m102 and m103 of the plurality of OIS driving units 12 is relatively small. For example, as illustrated in FIG. 1A, the magnets (e.g., m101) of the plurality of AF driving units 11A and 11B may be provided at locations that do not face each other on the left and right sides of a 'base line' connecting the centers of the lenses of the plurality of lens group units 13A and 13B, and the plurality of lens group units 13A and 13B themselves, while contacting any one side surface of the lens group unit-A 13A and the lens group unit-B 13B.

According to the various embodiments of the present disclosure, the lens group units 13 may be located on the plurality of image sensors 15. The plurality of lens group units 13A and 13B may include a lens group unit-A 13A for photographing of the image sensor-A 15A, and a lens group unit-B 13B for photographing of the image sensor-B 15B. The plurality of lens group units 13A and 13B may be seated in a space between the upper housing 141 and the lower housing 142 such that optical axes thereof are parallel to each other. At least a portion of each of the lens group units 13 may be exposed to the outside through the plurality of openings 145 of the upper housing 141. In an embodiment, each of the lens group units 13 may include a plurality of lenses for photographing an image in the interior thereof. Each of the lens group units (e.g., 13A) may include a body tube including the lens groups. The lens group unit-A 13A may have a first focal distance and a first angle of view, and the lens group unit-B 13B may have a second focal distance that is different from the first focal distance and a second angle of view that is different from the first angle of view. For example, the lens group unit-A 13A may include a wide-angle lens having a first angle of view (e.g., greater than or ">" the second angle of view) that is wider than that of the lens group unit-B 13B and the first focal distance (e.g., less than or "<" the second focal distance) that is shorter than that of the lens group unit-B 13B. The lens group unit-B 13B may include a telephoto lens having the second angle of view that is narrower than that of the lens group unit-A 13A and the second focal distance that is larger than that of the lens group unit-A 13A.

According to the various embodiments of the present disclosure, the AF driving unit-A 11A may include a driving structure configured to provide driving power for moving the lens group unit-A 13A forwards and rearwards along an optical axis 'O' of the lens group unit-A 13A. For example, the AF driving unit-A 11A may include a first coil c101 and a first magnet m101. If an electric voltage is applied to the first coil c101 through a first FPCB 16, an electromagnetic force formed between the first coil c101 and the first magnet m101 moves a second guide member g102 forwards and rearwards in the direction of the optical axis O, moving the lens group unit-A 13A forwards and rearwards in the direction of the optical axis O. The movement direction of the lens group unit-A 13A may be determined according to a direction of an electric voltage applied to the first coil c101.

According to the various embodiments of the present disclosure, the AF driving unit-A 11A may include a driving circuit unit p101 and a location detecting sensor p101 that detect a displacement and a location of the AF driving unit-A 11A. According to the embodiment, the location detecting sensor p101 may be integrated into the driving circuit unit p101. The location detecting sensor p101 may include a Hall sensor, and also may be implemented by using an optical or mechanical encoder. The driving circuit unit p101 may apply a driving signal for focusing to the first coil c101 based on focusing state information provided through a separate path, location information of the AF driving unit-A 11A detected by the location detecting sensor p101, and the like. For example, the location detecting sensor p101 of the AF driving unit-A 11A may be mounted on the first FPCB 16.

According to the various embodiments of the present disclosure, the AF driving unit-A 11A may move the lens group unit-A 13A forwards and rearwards in the direction of the optical axis O by using a first guide member g101, a second guide member g102, a third guide member g103, and a carrier g104. For example, referring to FIG. 1D the first guide member g101 may contact a first side surface of the second guide member g102 while a first coil c101 and a first magnet body m101 are interposed therebetween. The first guide member g101 may be fixed to the lower housing 142, for example, a side surface of the lower housing 142 to fix the first magnet m101 and yokes y101 and y102. As a plurality of coupling bosses (e.g., s101 of FIG. 1D) are inserted into a plurality of coupling recesses (e.g., s102 of FIG. 1D) provided on a first side surface of the second guide member g102, the first guide member g101 may contact the second guide member g102 (or fix the second guide member g102). The third guide member g103 and the carrier g104 may be seated in the interior of the second guide member g102. If electric power is supplied to the first coil c101 to generate an electromagnetic force between the first coil c101 and the first magnet m101, the second guide member g102 may be moved forwards and rearwards along the optical axis O by the electromagnetic force. The third guide member g103 and the carrier g104 seated in the second guide member g102 may be moved forwards and rearwards along the optical axis together with the second guide member g102. Accordingly, in the various embodiments of the present disclosure, when the second guide member g102 is moved forwards and rearwards in the direction of the optical axis O by the electromagnetic force, the third guide member g103 and the carrier g104 may be moved forwards and rearwards along the optical axis together with the second guide member g102.

According to the various embodiments of the present disclosure, the AF driving unit-A 11A may include a guide structure configured to guide forward and rearward movement of the lens group unit-A 13A in the direction of the optical axis O for focusing. For example, a plurality of first balls b1 (e.g., bearings) may be provided in a space between the first guide member g101 and the second guide member g102 to allow the AF driving unit-A 11A to smoothly move forwards and rearwards. Referring to FIG. 1D, in the various embodiments, the first guide member g101 may have a plurality of first guide grooves h101, and the second guide member g102 may have a plurality of second guide grooves h102 at locations corresponding to the plurality of first guide grooves h101. The first and second guide grooves h101 and h102 may restrict the plurality of first balls b1 from moving in a direction that is not the direction of the optical axis O as the first balls b1 are seated. When the second guide grooves h102 move forwards and rearwards along the optical axis by the electromagnetic force between the first coil c101 and the first magnet m101, the first balls b1 may roll between the first guide groove h101 and the second guide groove h102 to allow the lens unit-A 13A to smoothly move forwards and rearwards along the optical axis O. The first guide member g101 and the second guide member g102 may be prevented from directly contacting each other by properly designing the diameters of the first balls b1, and the second guide member g102 may smoothly move in the direction of the optical axis O.

According to the various embodiments of the present disclosure, the AF driving unit-A 11A may include a plurality of yokes y101 and y102. The plurality of yokes y101 and y102 may include a shield yoke and a suction yoke. For example, the first yoke y101 is a shield yoke, and may reduce a magnetic interference between the facing magnets. Referring to FIG. 1A, the first yoke y101 may be mounted on a surface of the first magnet m101, which faces the surface of the first magnet m101 contacting the first coil c101. For example, the second yoke y102 is a suction yoke, and may reduce a magnetic interference between the first magnet m101 and the second magnet m102 to a degree. Referring to FIG. 1A, the second yoke y102 may face the first magnet m101 while the first coil c101 is interposed therebetween. In the various embodiments of the present disclosure, the efficiency of a voice coil motor may be improved by the plurality of yokes y101 and y102. According to the various embodiments of the present disclosure, a suction yoke y101 and y121 and a shield yoke y102 and y122 may be added to a magnet (e.g., m101) and a coil (e.g., c101) of the AF driving units 11A and 11B to improve (e.g., reduce the occurrence of) interference between the magnetic fields.

According to the various embodiments of the present disclosure, the OIS driving unit-A 12A may include a driving structure configured to provide driving power for implementing anti-shake. For example, the OIS driving unit-A 12A may include at least two pairs of coils c102 and c103 and magnets m102 and m103. The two pairs of coils and the magnets, for example, the second coil c102 and the second magnet m102 and the third coil c103 and the third magnet m103 may be disposed inside the side surfaces of the lower housing 141, which are perpendicular to each other. Each of the pairs of coils and the magnet, for example, the second coil c101 and the second magnet m102 may be provided at locations that face each other. Similarly, the third coil c103 and the third magnet m103 may be provided at locations that face each other. In the various embodiments, if an electric voltage is applied to the second coil c102 through the first FPCB 16, the third guide member g103 may move in a first direction x (or a direction that is opposite to the first direction) at an upper end of the second guide member g102 by the electromagnetic force formed between the second coil c102 and the second magnet m102. Then, the carrier g104 seated in the third guide member g103 may move in the first direction x (or a direction that is opposite to the first direction). Accordingly, the third guide member g103 may move the lens group unit-A 13A in the first direction x (or a direction that is opposite to the first direction) that is perpendicular to the optical axis. If an electric voltage is applied to the third coil c103 through the first FPCB 16, the carrier g104 may move in a direction that is perpendicular to the optical axis, that is, the second direction y (or a direction that is opposite to the second direction) by the electromagnetic force formed between the third coil c103 and the third magnet m103. Accordingly, the lens group unit-A 13A seated in the carrier g104 may move in a direction that is perpendicular to the optical axis, for example, the second direction y (or a direction that is opposite to the second direction). Unlike this, the third guide member g103 may move in the second direction y (or a direction that is opposite to the second direction), and the carrier g104 may move in the first direction (a direction that is opposite to the first direction).

According to the various embodiments of the present disclosure, the OIS driving unit-A 12A may include a driving circuit unit p102 and a location detecting sensor p102 that detect a displacement and a location of the OIS driving unit-A 12A. According to the embodiment, as illustrated in FIG. 1C, the location detecting sensor p102 may be integrated into the driving circuit unit p102. For example, the location detecting sensor p102 and the driving circuit unit p102 may be provided at the centers of the coils c102 and c103. The location detecting sensor may include a Hall sensor, and may be implemented by using an optical or mechanical encoder. Based on the focusing state information provided through a separate path and location information of the OIS driving unit-A 12A detected by the location detecting sensor, the driving circuit unit may apply a driving signal (or an electric voltage) for anti-shake functionality to the second coil c102 or the third coil c103.

According to the various embodiments of the present disclosure, the OIS driving unit-A 12A may include a guide structure configured to guide movement of the lens group unit-A 13A in the first direction and the second direction. In the various embodiments, a plurality of third guide grooves h103 may be provided at corners of a lower surface of the interior of the second guide member g102, and a plurality of fourth guide grooves h104 may be provided at locations of the corners of the lower surface of the third guide member g103, which correspond to the third guide member 103. A plurality of second balls b2 may be provided in the spaces between the third guide grooves h103 and the plurality of fourth guide grooves h104. When an electromagnetic force is applied in the first direction (or a direction that is opposite to the first direction) by the second coil c102 and the second magnet m102, the plurality of second balls b2 may move in the first direction (or the direction that is opposite to the first direction). In the various embodiments, a plurality of fifth guide grooves h105 may be provided at the corners of an upper surface of the third guide member g103, and a plurality of sixth guide grooves h106 may be provided at locations of the corners of the lower surface of the carrier g104, which correspond to the plurality of fifth guide grooves h105. A plurality of third balls b3 may be provided in the spaces between the fifth guide grooves h105 and the plurality of sixth guide grooves h106. When an electromagnetic force is applied in the second direction y (or a direction that is opposite to the second direction) by the third coil c103 and the third magnet m103, the plurality of third balls b3 may move in the second direction (or the direction that is opposite to the second direction). The second guide member g102 and the third guide member g103 may be prevented from directly contacting each other by properly designing the diameters of the second balls b2, and the third guide member g103 may smoothly move in the first direction x. The third guide member g103 and the carrier g104 may be prevented from directly contacting each other by properly designing the diameters of the third balls b3, and the carrier g104 may smoothly move in the second direction.

According to the various embodiments of the present disclosure, in the OIS driving unit 12A, the suction yokes y103 and y104 may be provided below the second magnet m102 and the third magnet m103. The suction yokes y103 and y104 may be fixed to the second guide member g102, for example, a side surface of the second guide member g102. The suction yokes y103 and y104 may suction the magnetic forces of the second and third magnet m102 and m103.

According to the various embodiments of the present disclosure, the plurality of image sensors 15 may photograph an image by using light that passed through the lens group unit-B 13B and the lens group unit-A 13A.

According to another various embodiments of the present disclosure, the lens group unit-A 13A, the AF driving unit-A 11A, and the OIS driving unit-A 12A, and the guide members g101, g102, g103, and g104 thereof, and the lens group unit-B 13B, the AF driving unit-B 11B, and the OIS driving unit-B 12B, and the guide members thereof may be accommodated within different housings (see the dotted line of FIG. 1A) to contact each other.

According to various embodiments of the present disclosure, the dual camera lens assembly, to which anti-shake functionality and the automatic focusing function are applied, may prevent magnetic interferences by disposing the plurality of driving units at a location of small interferences and applying the suction yokes. According to various embodiments of the present disclosure, optical decentering and an occlusion disparity may be prevented by reducing magnetic interferences and thus reducing the distance between the lenses of the dual camera.

Figure 2:
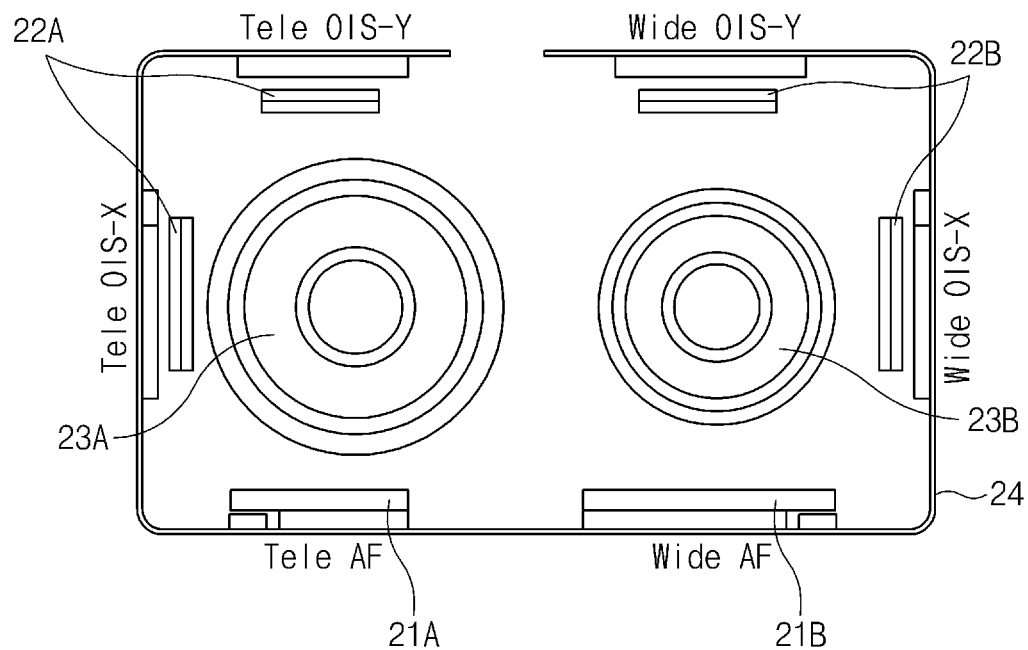
FIG. 2 is a view illustrating a dual camera lens assembly when viewed from the top according to various embodiments of the present disclosure.

FIG. 2 is a view illustrating a dual camera lens assembly when viewed from the top according to a various embodiments of the present disclosure.

As illustrated in FIG. 2, the dual camera lens assembly 20 according to the various embodiments of the present disclosure may include a plurality of AF driving units 21A and 21B and a plurality of OIS driving units 22A and 22B on a plurality of side surfaces of the plurality of lens group units 23A and 23B accommodated within the housing 24.

As illustrated in FIG. 2, according to the various embodiments of the present disclosure, the plurality of AF driving units 21A and 21B may be provided on one surface of the housing 24, which does not contact an extension line of a base line. The plurality of OIS driving units 22A and 22B may be provided on side surfaces of the plurality of lens group units 23A and 23B, on which the plurality of AF driving units 21A and 21B are not present. Each of the plurality of OIS driving units 22A and 22B may include a first direction driving unit Tele OIS-X and Wide OIS-X and a second direction driving unit Tele OIS-Y and Wide OIS-Y. The first direction driving unit Tele OIS-X and Wide OIS-X and the second direction driving unit Tele OIS-Y and Wide OIS-Y may be disposed on side surfaces of the housing 24, which are perpendicular to each other.

In the various embodiments, the plurality of AF driving units 21A and 21B may be spaced apart from each other at a threshold interval or more to prevent magnetic interferences. The threshold interval may be determined through a driving test of the plurality of AF driving units 21A and 21B.

According to another various embodiments of the present disclosure, the lens group unit-A 23A, the AF driving unit-A 21A, and the OIS driving unit-A 22A, and the guide members (e.g., g101 to g104 of FIGS. 1A to 1D) thereof, and the lens group unit-B 23B, the AF driving unit-B 21B, and the OIS driving unit-B 22B, and the guide members thereof may be accommodated within different housings so as to contact each other.

Figure 3:
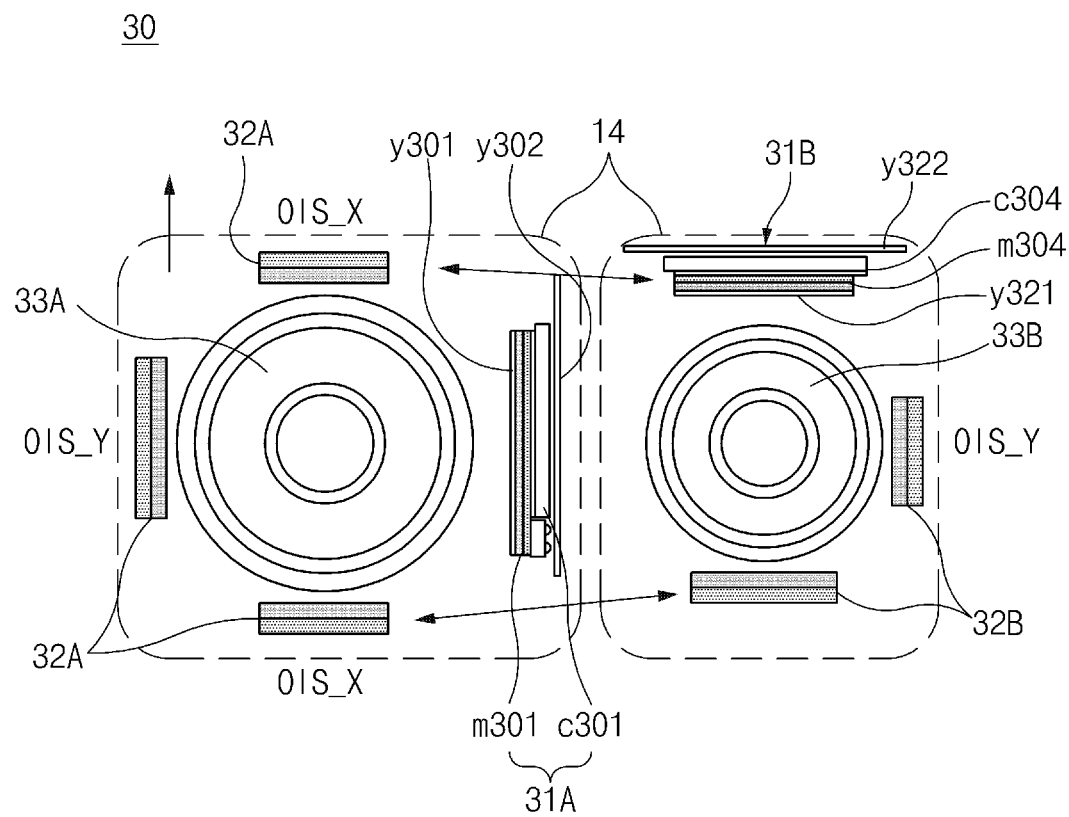
FIG. 3 is a view illustrating a dual camera lens assembly when viewed from the top according to various embodiments of the present disclosure.

FIG. 3 is a view illustrating a dual camera lens assembly when viewed from the top according to a various embodiments of the present disclosure. The configuration of the dual camera lens assembly 30 of FIG. 3 according to the various embodiments of the present disclosure is similar to those of FIGS. 1A to 1D, but differs in the disposition structure of the plurality of AF driving units 31A and 31B. In a description of the various embodiments of the present disclosure, it is noted that the same reference numerals are given to the configurations that may be easily understood through the prior embodiments and a detailed description thereof may be omitted.

As illustrated in FIG. 3, according to the various embodiments of the present disclosure, the AF driving unit-A 31A, the OIS driving unit-A 32A, and the lens group unit-A 33A, and the member that guides the movements thereof, and the AF driving unit-B 31B, the OIS driving unit-B 32B, and the lens group unit-B 33B, and the member that guides the movements thereof may be accommodated in different housings.

According to the various embodiments of the present disclosure, one of the AF driving unit-A 31A and the AF driving unit-B 31B may be located between the lens group unit-A 33A and the lens group unit-B 33B, and the other of the AF driving unit-A 31A and the AF driving unit-B 31B may be located to be parallel to the base lines BL of the plurality of lens group units 33A and 33B. For example, the AF driving unit-A 31A may be located between the lens group unit-A 33A and the lens group unit-B 33B, and the AF driving unit-B 31B may be disposed to be parallel to the base lines of the plurality of lens group units 33A and 33B. The magnet m301 and the coil c301 of the AF driving unit-A 31A may be disposed to face each other, and the suction yoke y302 and the shield yoke y301 may contact or be attached to surfaces of the magnet m301 and the coil c301, which do not face each other. The magnet m104 and the coil c104 of the AF driving unit-A 31B may be disposed to face each other, and the suction yoke y321 and the shield yoke y322 may contact or be attached to surfaces of the magnet m104 and the coil c104 of which do not face each other.

In the various embodiments of the present disclosure, the suction yoke y302, y322 and the shield yoke y301, y321 may reduce magnetic field intensity of the plurality of OIS driving units 32A and 32B as well as the plurality of AF driving units 31A and 31B, which in turn may reduce operational errors caused by magnetic interferences.

According to the various embodiments of the present disclosure, the OIS driving unit-A 32A and the OIS driving unit-B 32B may be located on side surfaces of the plurality of lens group units 33A and 33B, on which the plurality of AF driving units 31A and 31B are not located. Each of the OIS driving unit-A 32A and the OIS driving unit-B 32B may include a first direction driving unit OIS_X for movement of the lens group unit in the first direction and a second direction driving unit OIS_Y for movement of the lens group unit in the second direction. Each of the first direction driving unit OIS_X and the second direction driving unit OIS_Y may include a pair of magnets and a coil, and may include two or more pairs of magnets and coils.

Figure 4A:
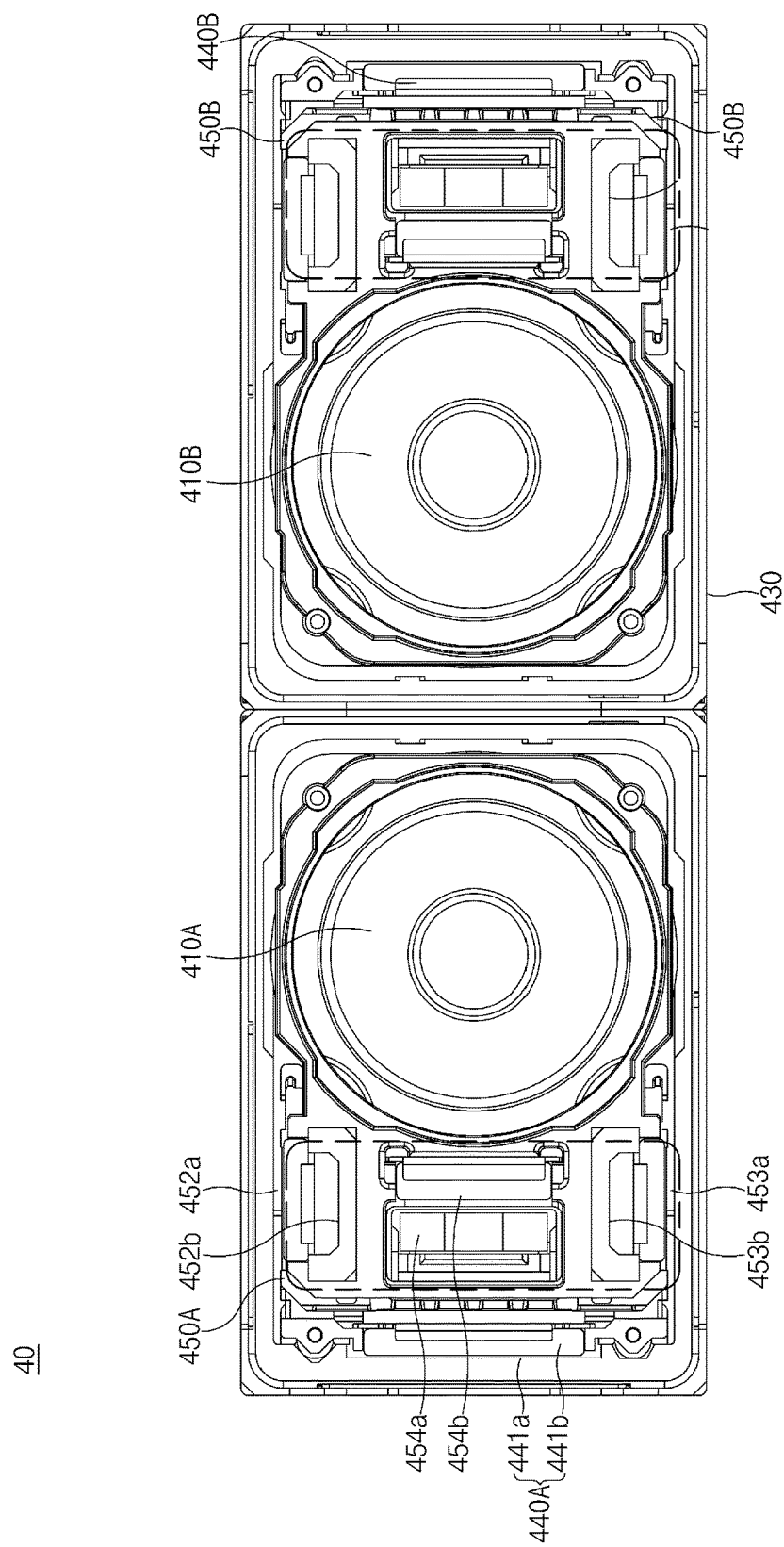
FIG. 4A is a view illustrating a dual camera lens assembly when viewed from the top according to various embodiments of the present disclosure.
Figure 4B:
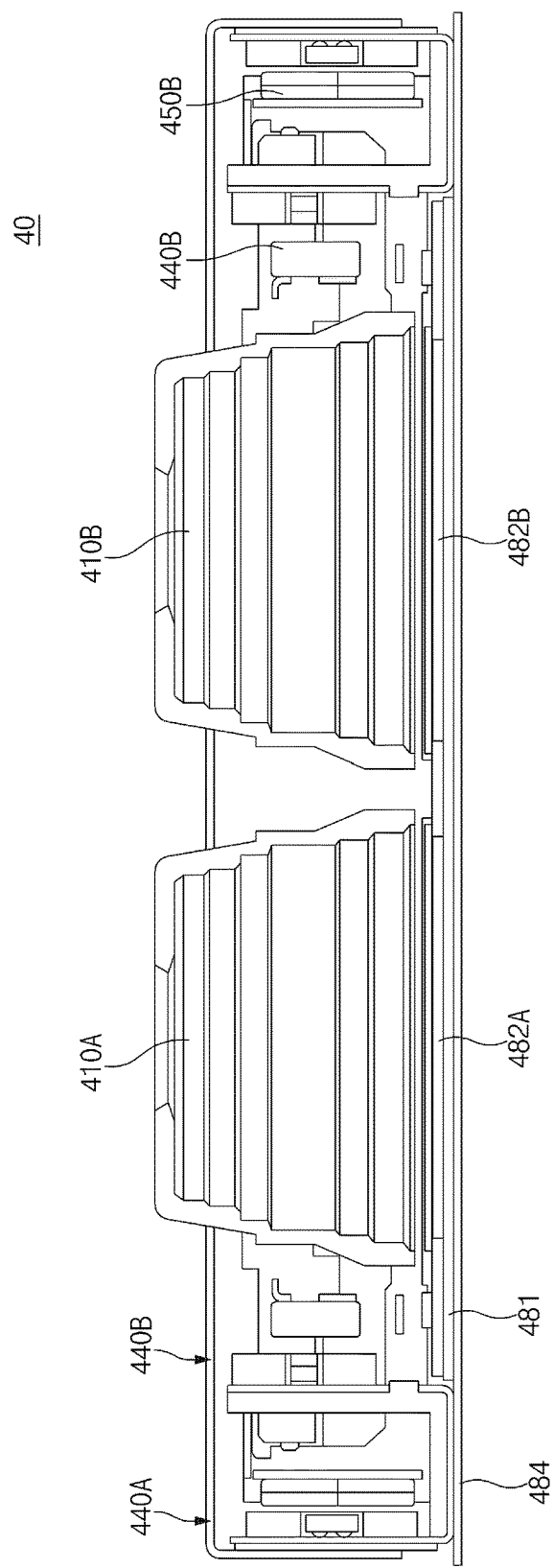
FIG. 4B is a sectional view of the dual camera lens assembly according to various embodiments of the present disclosure.
Figure 4C:
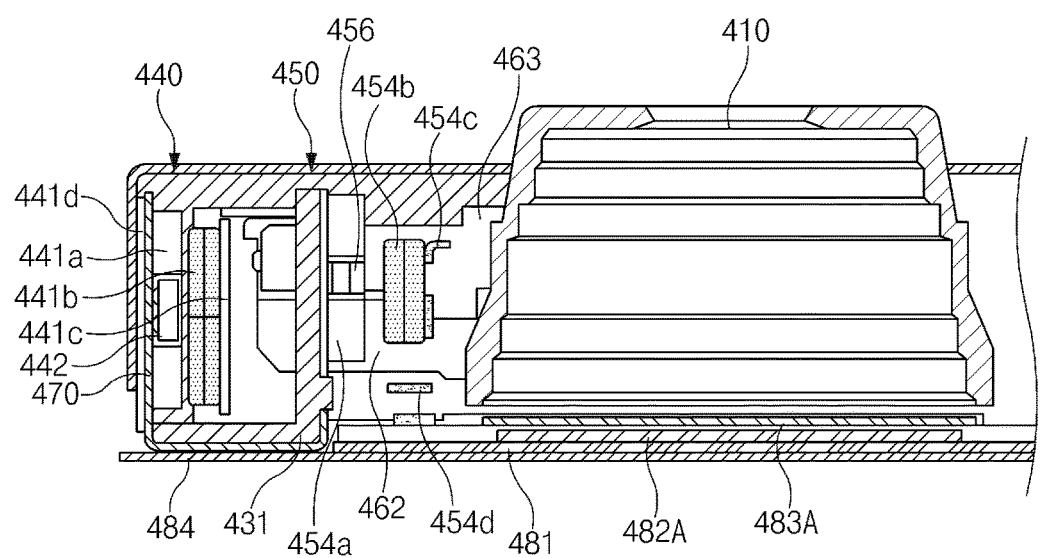
FIG. 4C is an enlarged sectional view of a camera lens assembly of a dual camera lens assembly according to various embodiments of the present disclosure.
Figure 4D:
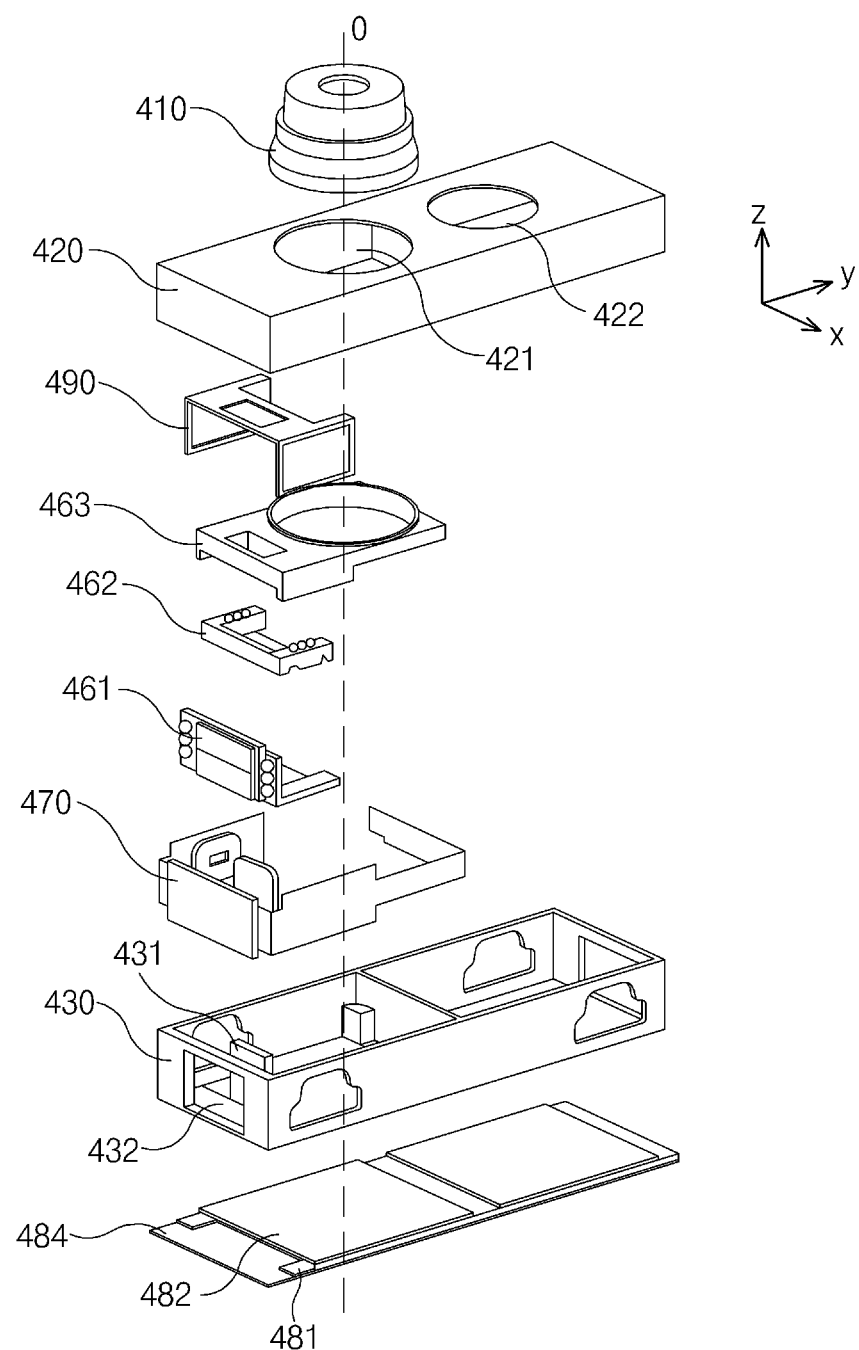
FIG. 4D, FIG. 4E and FIG. 4F are exploded views of a camera lens assembly or some components of a dual camera lens assembly according to various embodiments of the present disclosure.
Figure 4E:
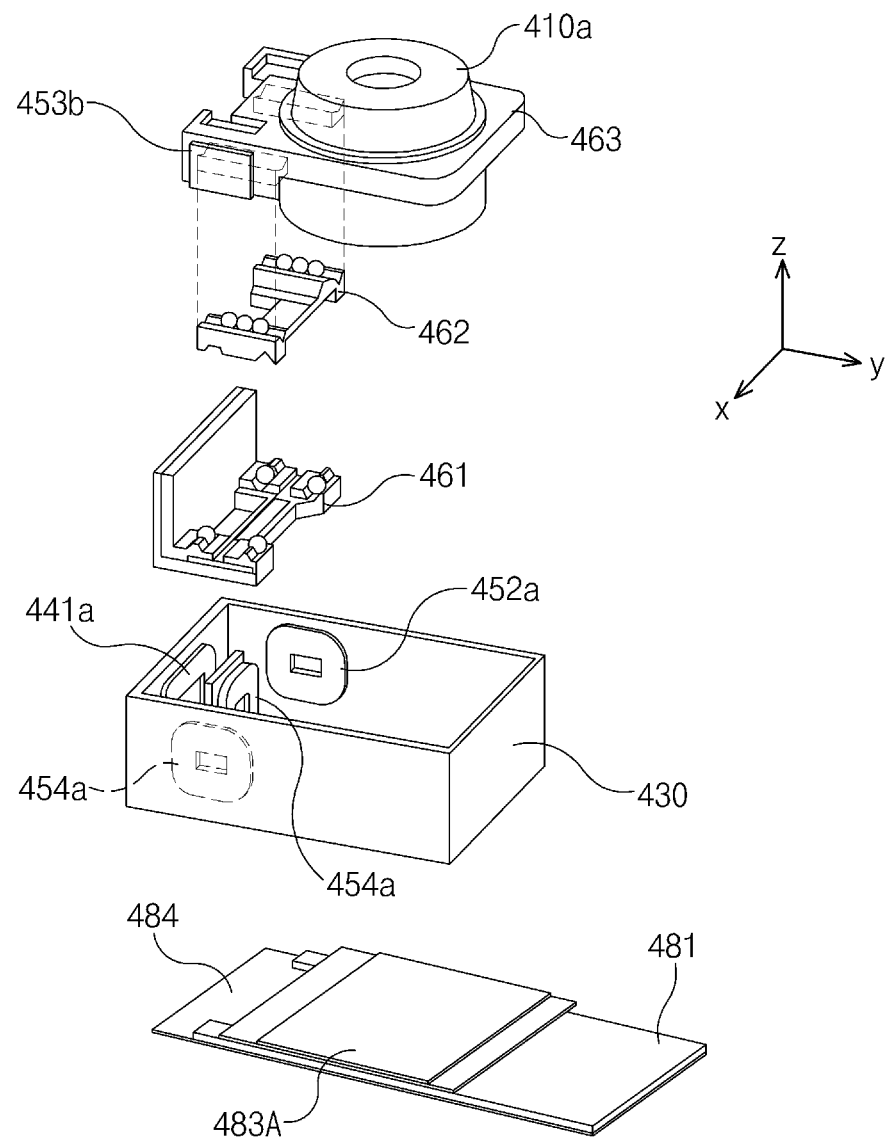
Figure 4F:
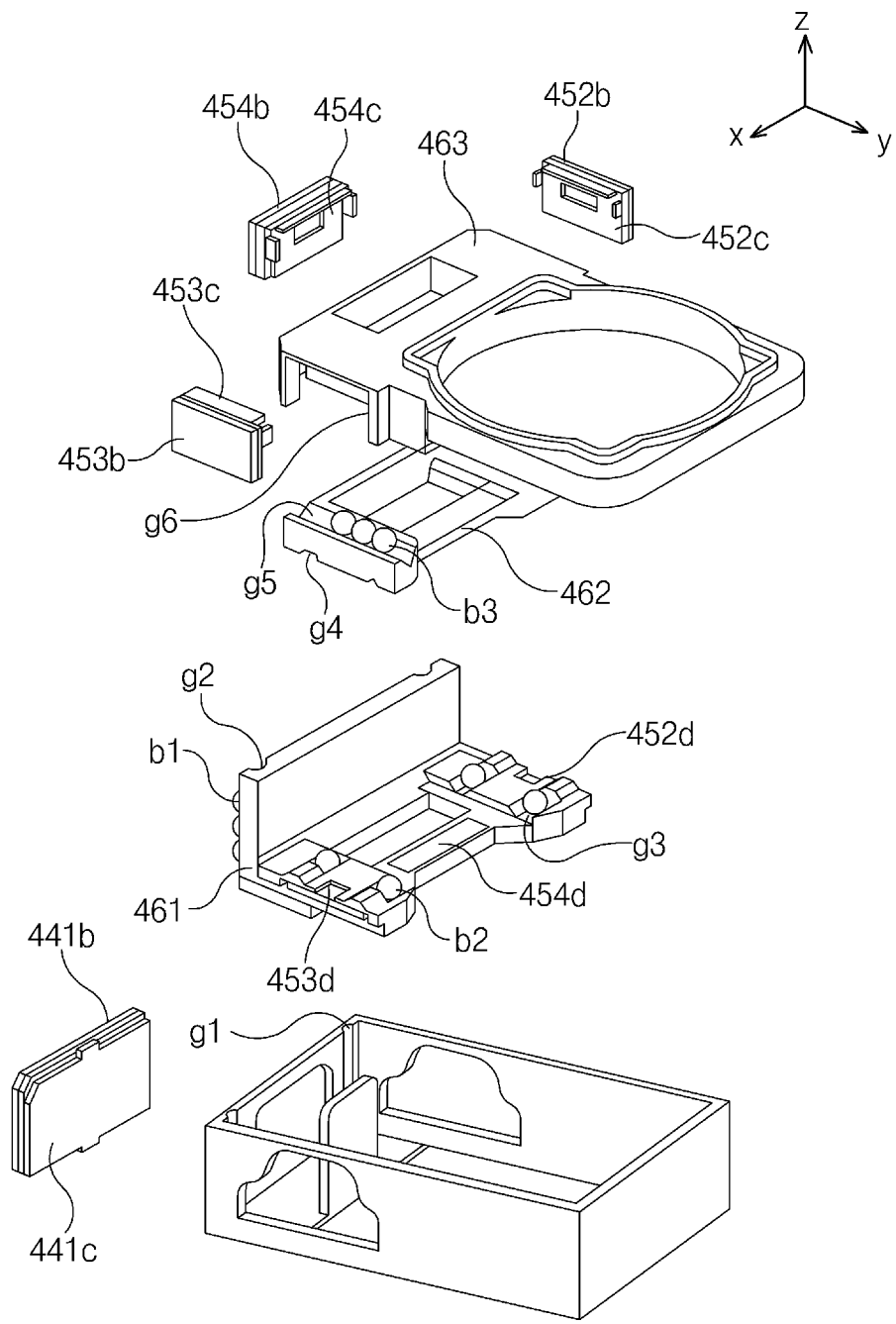
Figure 4G:
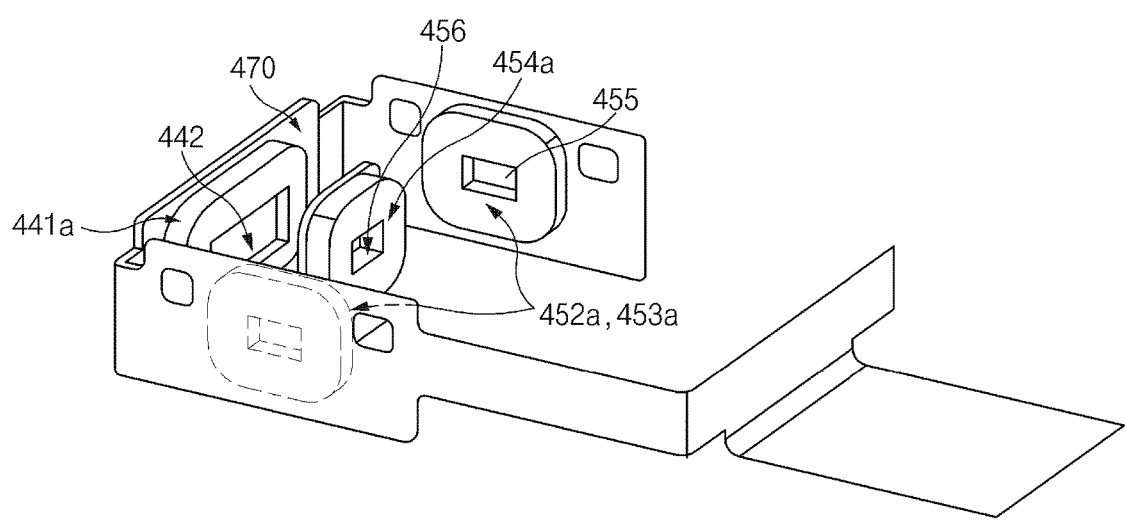
FIG. 4G is a view illustrating a flexible printed circuit board (FPCB) according to various embodiments of the present disclosure.
Figure 4H:
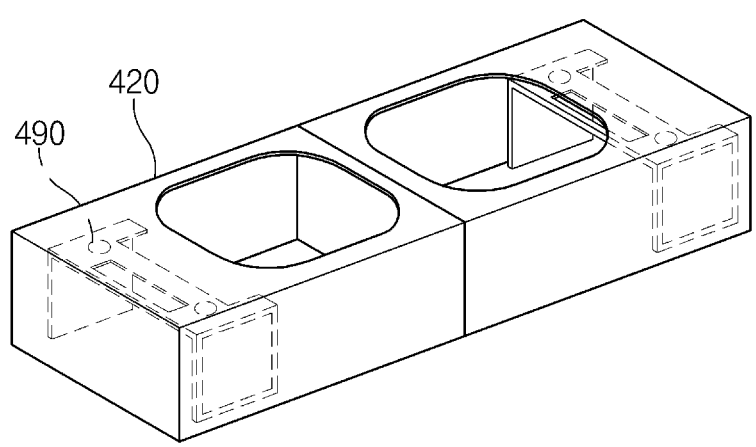
FIG. 4H is a view illustrating an upper housing and a stopper member according to various embodiments of the present disclosure.

FIG. 4A is a view illustrating a dual camera lens assembly when viewed from the top according to a various embodiments of the present disclosure. FIG. 4B is a sectional view of the dual camera lens assembly according to the various embodiments of the present disclosure. FIG. 4C is an enlarged sectional view of a camera lens assembly of a dual camera lens assembly according to the various embodiments of the present disclosure. FIGS. 4D to 4F are exploded views of a camera lens assembly or some components of a dual camera lens assembly according to the various embodiments of the present disclosure. FIG. 4G is a view illustrating an FPCB according to the various embodiments of the present disclosure. FIG. 4H is a view illustrating an upper housing and a stopper member according to the various embodiments of the present disclosure. The exploded views of the dual camera lens assembly of FIGS. 4C to 4F according to the various embodiments of the present disclosure illustrate one exploded view of one camera lens assembly for easiness of description.

Referring to FIGS. 4A to 4H, the dual camera lens assembly 40 according to the various embodiments of the present disclosure may include housings 420 and 430, a lens group unit-A 410B, a lens group unit-B 410B, driving module-As 440A and 450A, and a driving module-B 450B. In the various embodiments of the present disclosure, at least one of the housings 420 and 430, the lens group unit-A 410A, the lens group unit-B 410B, the driving module-As 440A and 450A, and the driving module-B 450B may be omitted. The configurations of the lens group unit-A 410A, the lens group unit-B 410B, the driving module-As 440A and 450A, and the driving module-B 450B may be different each other in view of the sizes and the locations of the components but the components may be almost similar. Accordingly, in the following description, it is noted that the camera lens assembly A including the lens group unit-A 410A and the driving module-As 440A and 450A will be described as a reference, and 'A' will be omitted from some numberings of the components.

According to the various embodiments of the present disclosure, as illustrated in FIGS. 4A to 4C, the housings 420 and 430 may accommodate a plurality of lens group units 410A and 410B (hereinafter, referred to as 410) and a plurality of driving modules 440A, 450A, 440B, and 450B (hereinafter, referred to as 440 and 450). The housings 420 and 430 may provide a substantially closed space for the plurality of image sensors 482. The housings 420 and 430 may be largely classified into a lower housing 430 and an upper housing 420.

According to the various embodiments of the present disclosure, the upper housing 420 may be coupled to the lower housing 430 to enclose the lens group unit-A 410A and the lens group unit-B 410B. In the various embodiments, the upper housing 420 may have a shape (e.g., a hexahedral shape a lower surface of which is opened) that surrounds almost all portions of side surfaces of the lower housing 430. If the upper housing 420 and the lower housing 430 are coupled to each other, the side surfaces of the upper housing 420 may surround almost all portions of the side surfaces of the lower housing 430.

According to the various embodiments of the present disclosure, the upper housing 420 may include a plurality of openings 421 and 422, and the openings 421 and 422 may accommodate the plurality of lens group units 410 such that at least a portion of the lens group unit-A 410A and at least a portion of the lens group unit-B 410B. For example, the lens group unit-a 410A and the lens group unit-B 410B may be inserted into the plurality of openings 421 and 422 at an upper end or a lower end of the plurality of openings 421 and 422 and be accommodated in the plurality of openings 421 and 422.

According to the various embodiments of the present disclosure, the lower housing 430 may be coupled to the upper housing 420 above the printed circuit board 481. In the various embodiments, the lower housing 430 may be classified into a driving area in which the lens group unit-A 410A and the driving module 440A are accommodated, and a photographing area in which the lens group unit-B 410B and the driving module-B 450B are accommodated. In the various embodiments, referring to FIG. 4D, at least one partition 431 may be formed between the photographing area and the driving area of the lower housing 430. Referring to FIG. 4B, a lower surface of the photographing area of the lower housing 430 may be opened for interfacing the image sensors 482A and 482B and the lens units 410A or 420B. A lower surface of the driving area of the lower housing 430 may be closed such that the plurality of driving modules 440 and 450 are stably accommodated.

According to the various embodiments of the present disclosure, the printed circuit board 481 may be located under the lower housing 430, and the image sensor-A 482A and the image sensor-B 482B may be mounted on an upper surface TOP or a lower surface BOTTOM thereof. FIGS. 4A to 4H exemplifies that the image sensor-A 482A is mounted on an upper surface of the printed circuit board 481. In the various embodiments, the printed circuit board 481 may be a dedicated printed circuit board for mounting the plurality of image sensors 482. One printed circuit board 481 may be provided for each of the image sensors 482A or 482B, and may be provided for each of a plurality of image sensors 482. FIGS. 4A to 4H exemplifies that the image sensors 482A or 482B are mounted on an upper surface of one printed circuit board 481.

According to the various embodiments of the present disclosure, a metal plate 484 may be provided under the printed circuit board 481. An area of the printed circuit board 481, which is located under the driving area of the lower housing 430, may be cut away. For example, the cut-away area of the printed circuit board 481 may be lower surface portions of the plurality of AF driving units (or modules) 440 for implementing an automatic focusing function of the plurality of driving modules 440 and 450. By the cut-away area of the printed circuit board 481, the height of the driving area of the lower housing 430 may be secured further. Accordingly, in the various embodiments of the present disclosure, the driving area of the driving module for automatic focusing may be secured further.

According to the various embodiments of the present disclosure, a filter part-A 483A and a filter part-B 483B may be fixed between an upper side of the plurality of image sensors 482 on the upper surface of the printed circuit board 481 and the photographing area of the lower housing 430. For example, the filter part-A 483A and the filter part-B 483B may be films (or filters) that interrupt infrared rays.

According to the various embodiments of the present disclosure, the plurality of lens group units 410 may be a plurality of body tubes located on the plurality of image sensors 482. The plurality of lens group units 410 may include a lens group unit-A 410A for photographing of the image sensor-A 482A and a lens group unit-B 410B for photographing of the image sensor-B 482B. The plurality of lens group units 410 may be accommodated in the plurality of openings 421 and 422 of the upper housing 420 such that the optical axes thereof may be parallel to each other. In an embodiment, each of the lens group units 410A and 410B may include a plurality of lenses for photographing an image in the interior thereof. According to the embodiment, the lens group units 410 may include lens groups having different angles of view and different focal distances. For example, the lens group unit-A 410A may include a wide-angle lens having a first angle (>the second angle) that is wider than that of the lens group unit-B 410B and the first focal distance (<the second focal distance) that is shorter than that of the lens group unit-B 410B. The lens group unit-B 410B may include a telephoto lens having the second angle of view that is narrower than that of the lens group unit-A 13A and the second focal distance that is larger than that of the lens group unit-A 13A.

According to the various embodiments of the present disclosure, referring to FIG. 4E, the lens group units (e.g., 410A) may be inserted into the carriers (e.g., 463) to move in the same direction as the carrier (e.g., 463) when the lens group units move along the optical axis O of the carriers (e.g., 463), the first direction x, or the second direction. A detailed configuration thereof will be described below.

According to the various embodiments of the present disclosure, the dual camera lens assembly 40 may include a plurality of driving modules 440 and 450 on an extension line of a base line of the lens. For example, as illustrated in FIGS. 4A and 4B, the plurality of driving modules 440 and 450 may be disposed on the side surfaces of the housings 420 and 430 on the extension lines of the base lines of the lens group units (e.g., 410A). Accordingly, magnetic interference between the driving modules 440A, 440B, 450A, and 450B of the two lens group units 410A and 410B may be prevented and/or reduced.

According to the various embodiments of the present disclosure, the driving modules (e.g., 450A and 440A) may be provided on first side surfaces of the lens group units (e.g., 410A) to allow the lens group unit (e.g., 410A) to move forwards and rearwards in the direction of the optical axes O of the lens group units (e.g., 410A) or to move in a direction that is perpendicular to the lens group units (e.g., 410A).

According to the various embodiments of the present disclosure, the driving modules (e.g., 440A and 450A) may move the lens group units (e.g., 410A) in the direction of the optical axis O, the first direction x, or the second direction y through the guide structures of the lower housing 430, the first guide member 461, the second guide member 462, and the carriers (e.g., 463). In an embodiment, as illustrated in FIG. 4D, the first guide member 461 may be seated in the driving area of the lower housing 430, the second guide member 462 may be positioned on a first surface of the first guide member 461, and the driving areas of the carriers (e.g., 463) may be located on the second guide member 462. In an embodiment, the first guide member 461 may have a shape (e.g., an L shape) two surfaces (a side surface and a lower surface) of which are perpendicular to each other. The second guide member 462 may have a rectangular shape positioned on the first surface of the first guide member 461 that is perpendicular to the bottom surface of the lower housing 430. Accordingly, the forward and rearward movement of the first guide member 461 may lead (e.g., or otherwise correspond or correlate to) the forward and rearward movements of the lens group units (e.g., 410A) via the second guide member 462 and the carrier 463. In one embodiment, as illustrated in FIG. 4D, the movement of the second guide member 462 or the movement of the carrier 463 may lead the movements of the lens group units (e.g., 410A). Hereinafter, a description thereof will be made together with the description of the components of the driving module-As 440A and 450A.

According to the various embodiments of the present disclosure, the driving modules 440 and 450 may include an AF driving unit 440 and an OIS driving unit 450.

According to the various embodiments of the present disclosure, the AF driving unit-A 440A may include a driving structure configured to generate driving power (e.g., force) for moving the lens group unit-A 13A forwards and rearwards along a first optical axis O. In an embodiment, the AF driving unit-A 440A may include at least one pair of first coils 441a and a first magnet 441b. The first coil 441a and the first magnet 441b may be fixed to locations facing each other. For example, the first coil 441a may be fixed to an outside of the opened first side surface 432 of the lower housing 430, and the first magnet 441b may be located in the first guide member 461 on the inside of the opened first side surface 432 of the lower housing 430. The first coil 441a and the first magnet 441b may face each other while the opened first side surface 432 of the lower housing 430 is interposed therebetween. If an electric voltage is applied to the first coil 441a through the flexible printed circuit board or "FPCB" 470, an electromagnetic force formed between the first coil 441a and the first magnet 441b according the direction of the applied electric voltage may move the first guide member 461 along the optical axis O. The second guide member 462 and the carrier 463 positioned on the first surface of the first guide member 461 may move the lens group unit-A 410A forwards and rearwards in the direction of the optical axis O as they move forwards and rearwards together with the first guide member 461.

The AF driving unit-A 440A may include a driving circuit unit 442 and a location detecting sensor 442 that detect a displacement and a location of the AF driving unit-A 440A. According to the embodiment, the location detecting sensor 442 may be integrated into the driving circuit unit 442. The location detecting sensor 442 may be a Hall sensor, and may be implemented by an optical or mechanical encoder. The driving circuit unit 442 may apply a driving signal for focusing to the first coil 441a based on focusing information provided through a separate path and location information of the AF driving unit-A 440A detected by the location detecting sensor.

According to the various embodiments of the present disclosure, the AF driving unit-A 440A may include a guide structure configured to guide forward and rearward movement of the lens group unit-A 13A in the direction of the optical axis O. For example, referring to FIG. 4F, the AF driving unit-A 440A may include a plurality of guide grooves g1 disposed at corners of an inner surface of the opened first side surface 432 of the lower housing 430, and a plurality of guide grooves g2 disposed at portions in which side surfaces of the first guide member 461 contact one another. The guide grooves g1 of the lower housing 430 and the guide grooves g2 of the first guide member 461 may be 'V' shaped cuts or 'U' shaped cuts formed in the orientation of the optical axis O. A plurality of first balls b1 may be provided between the guide grooves g1 of the lower housing 430 and the guide grooves g2 of the first guide member 461. Because neither a V cut nor a U cut is formed at opposite ends of each of the guide groove g1 and g2, the plurality of balls b1 may be prevented from being separated. When the guide member 461 is moved forwards and rearwards in the direction of the optical axis by an electromagnetic force between the first magnet 441b and the first coil 441a, the plurality of first balls may roll between the guide grooves g1 of the lower housing 430 and the guide grooves g2 of the first guide member 461. The first guide member 461 may be prevented from directly contacting the lower housing 430 by appropriate configuration of the diameters of the first balls b1, and the first guide member 461 may thereby smoothly move in the direction of the optical axis O (or in other embodiments, in a direction that is opposite to the direction of the optical axis O).

According to the various embodiments of the present disclosure, the OIS driving unit-A 450A may include a driving structure configured to provide driving power for anti-shake functionality. For example, the OIS driving unit-A 450A may include at least two pairs of magnets 452b, 453b, and 454b and coils 452a, 453a, and 454a configured to provide driving power for movement of the lens group unit-A 410A in the first direction x and the second direction y. If an electric voltage is applied to the second and third coils 452a and 453a through the FPCB 470, the second and third coils 452a and 453a may generate an electromagnetic force between the second and third magnets 452b and 453b according to the direction of the electric voltage. According to the direction of the electromagnetic force, the second guide member 462 may move on the first surface of the first guide member 461 in the first direction or a direction that is opposite to the first direction. If the second guide member 462 moves, the carrier 463 and the lens-group unit-A 410A may move in the first direction x. If an electric voltage is applied to the fourth coil 454a through the FPCB 470, the carrier 463 may move on the upper surface of the second guide member 462 in the second direction or a direction that is opposite to the second direction by an electromagnetic force between the fourth coil 454a and the fourth magnet 454b according to the direction of the electric voltage. Due to the movement of the carrier 463, the lens group unit-A 410A may move in the second direction y or a direction that is opposite to the second direction. In the various embodiments, it has been illustrated that two pairs of coils 452a and 453a and magnets 452b and 453b provide driving power for the first direction x, and a pair of coil 454a and magnet 454b provide driving power for the second direction y. The two pairs of coil 452a and 453a and magnets 452b and 453b may have a size that is smaller (for example, a half) than that of the one pair of coils 454a and magnet 454b. In another various embodiments, when the driving power may be adjusted by selecting another material or thickness of the coils and the magnets, the sizes of the plurality of coils 452a, 453a, and 454a and the plurality of magnets 452b, 453b, and 454b may be the same or similar.

According to the various embodiments of the present disclosure, the OIS driving unit-A 450A may include location detecting sensors 455 and 456 configured to detect a displacement and a location of the OIS driving unit-A 450A. Because the OIS driving unit-A 450A may move in at least two directions, for example, the first and second directions x and y, the OIS driving unit-A 450A may include a plurality of location detecting sensors 455 and 456. In an embodiment, the OIS driving unit-A 450A may include a plurality of location detecting sensors 455 and 456 disposed adjacent to the second to fourth coils 452a, 453a, and 454a. The plurality of location detecting sensors 455 and 456 may include Hall sensors, and may be implemented by optical or mechanical encoders. Based on vibration information detected through an angular speed sensor mounted on the electronic device, for example, information on the amount and direction of shaking of a hand, location information of the OIS driving unit-A 450A detected by the plurality of location detecting sensors, and the like, a driving signal for anti-shake functionality may be applied to the second to fourth coils 452a, 453a, and 454a. In various embodiments of the present disclosure, focusing and anti-shake functionality may be stably realized with a relatively simple structure by disposing an AF driving unit for focusing and an OIS driving unit for anti-shake functionality.

According to the various embodiments of the present disclosure, the OIS driving unit-A 450A may include a guide structure configured to guide movement of the lens group unit-A 13A in the first direction. For example, referring to FIG. 4F, the OIS driving unit-A 450A may include a plurality of guide grooves g3 at corner areas of the upper surface of the first surface of the first guide member 461. The OIS driving unit-A 450A may include a plurality of fourth guide grooves g4 in areas corresponding to the plurality of third guide grooves g3 in corner areas of the lower surface of the second guide member 462. The third guide grooves g3 and the fourth guide grooves g4 may be V cuts or U cuts formed in the first direction 'x' (as indicated in the illustrated x-y-z axis). A plurality of second balls b2 may be provided in the spaces between the third guide grooves g3 and the plurality of fourth guide grooves g4. In an embodiment, the plurality of third guide grooves g3 and the plurality of fourth guide grooves g4 may restrain the plurality of second balls b2 from moving in a direction that is different from the first direction x or being discharged to the outside. Accordingly, the second balls b2 may move in the first direction x (or a direction that is opposite to the first direction x) between the third guide grooves g3 and the fourth guide grooves g4. The first guide member 461 and the second guide member 462 may be prevented from directly contacting each other by appropriate configuration of the diameters of the second balls b2, and the lens group unit-A 410A may thus smoothly move in the first direction x.

According to the various embodiments of the present disclosure, the OIS driving unit-A 450A may include a guide structure configured to guide movement of the lens group unit-A 13A in the second direction y. For example, a plurality of fifth guide grooves g5 may be formed on opposite sides of the upper surface of the second guide member 462. A plurality of sixth guide grooves g6 may be formed on a surface of the carrier 463, which faces the plurality of fifth guide grooves g5. The fifth guide grooves g5 and the sixth guide grooves g6 may be V cuts or U cuts formed in the second direction y. A plurality of third balls b3 may be provided in the spaces between the fifth guide grooves g5 and the plurality of sixth guide grooves g6. In an embodiment, the plurality of fifth guide grooves g5 and the plurality of sixth guide grooves g6 may restrain the plurality of third balls b3 from moving in a direction that is different from the second direction y or being discharged to the outside. Accordingly, the third balls b3 may move in the second direction y (or a direction that is opposite to the second direction y) between the fifth guide grooves g5 and the sixth guide grooves g4. The second guide member 462 may be prevented from directly contacting the carrier 463 by properly designing the diameters of the third balls b3, and the lens group unit-A 410A may smoothly move in the second direction y.

According to the various embodiments of the present disclosure, referring to FIGS. 4D, 4F, and 4G, shield yokes 441c, 451c, 453c, and 454c may be mounted on at least surfaces of the magnets 441b, 452b, 453b, and 454b. The shield yokes 441c, 452c, 453c, and 454c may reduce magnetic interferences between facing magnets. For example, the first shield yoke 441c mounted on one surface of the first magnet 441b and the fourth yoke 454c mounted on one surface of the fourth magnet 454b may reduce magnetic interferences between the first magnet 441b and the fourth magnet 454b. For example, the second yoke 452c mounted on one surface of the second magnet 452b and the third yoke 453c mounted on one surface of the third magnet 453b may reduce magnetic interferences between the second magnet 452b and the third magnet 453b to a degree. In this way, in the various embodiments of the present disclosure, the efficiency of a voice coil motor may be improved by reducing magnetic interferences with the plurality of shield yokes.

According to the various embodiments of the present disclosure, the suction yokes 441d, 452d, 453d, and 454d may be provided on the rear surface of the first coil 441a and the lower surface of the first guide member 461. For example, a seventh suction yoke 441d may be provided on the rear surface of the first coil 441a. Fifth and sixth yokes 452d, 453d, and 454d may be provided in an area contacting the lower ends of the second to fourth magnets 452b, 453b, and 454b of the first guide member 461. The fifth and sixth yokes 452d, 453d, and 454d may suction the magnetic forces of the second to fourth magnets 452b, 453b, and 454b to allow the magnetic forces between the magnets and the coils of the second to fourth magnets 452b, 453b, and 454b and the second to fourth coils 452a, 453a, and 454a, which face each other. Accordingly, because the second to fourth magnets 452b, 453b, and 454b may have a tendency to be attached to the first guide member 461 and the second guide member 462, the first and second guide members 462 may be attached to the carrier 463 to support smooth movement of OIS driving unit-A 450A for an OIS function. In this way, in the various embodiments of the present disclosure, the efficiency of a voice coil motor may be improved by the plurality of yokes.

According to the various embodiments of the present disclosure, each of the carriers (e.g., 463) may include a photographing area in which the lens group unit (e.g., 410A) is accommodated and a driving area associated with the driving module (e.g., 450). For example, the carrier 463 may include at least one opening, and the lens group unit-A 410A may be inserted through the upper end or the lower end of the opening to fix the lens group unit-A 410A. The openings of the carriers (e.g., 4623) may correspond to a circumference of the lens group unit-A 410A. A plurality of magnets 441*b*, 452*b*, 453*b*, and 454*b* included in the OIS driving units 450 may be fixed to the driving areas of the carriers (e.g., 463). For example, as illustrated in FIG. 4F, the second to fourth magnets 452*b*, 453*b*, and 454*b* may be fixed to a lower side of the driving area of the carrier 463.

According to the various embodiments of the present disclosure, as illustrated in FIG. 4G, the plurality of coils 452*a*, 453*a*, and 454*a* for an AF function for the direction of the optical axis O and the OIS function for the first direction x and the second direction y may be mounted on the FPCB 470. The FPCB 470 may receive electric power from an external circuit and supply the received electric power to the plurality of coils 452*a*, 453*a*, and 454*a*. In the various embodiments, the plurality of coils 452*a*, 453*a*, and 454*a* may receive electric power under the control of at least one processor. For example, the processor may be a dedicated processor configured to control the dual camera lens assembly 40, and may be a main processor of the electronic device on or in which the dual camera lens assembly 40 is mounted. The FPCB 470 may be provided in each of the camera lens assemblies. For example, two FPCBs 470 may be provided to mount coils of the camera lens assemblies.

According to the various embodiments of the present disclosure, as illustrated in FIG. 4H, the driving module-As 440A and 450A may include a structure for restricting a range of forward and rearward movement of the lens group unit-A in the direction of the optical axis O. For example, the driving module-As 440A and 450A may further include a stopper member 490 of the carrier 463, and may restrict a movement range of the carrier 463 in the direction of the optical axis by the stopper member 490.

In various embodiments of the present disclosure, the dual camera lens assembly may reduce magnetic interferences between the plurality of driving modules for an automatic focusing function and an anti-shake functionality.

Figure 5A:
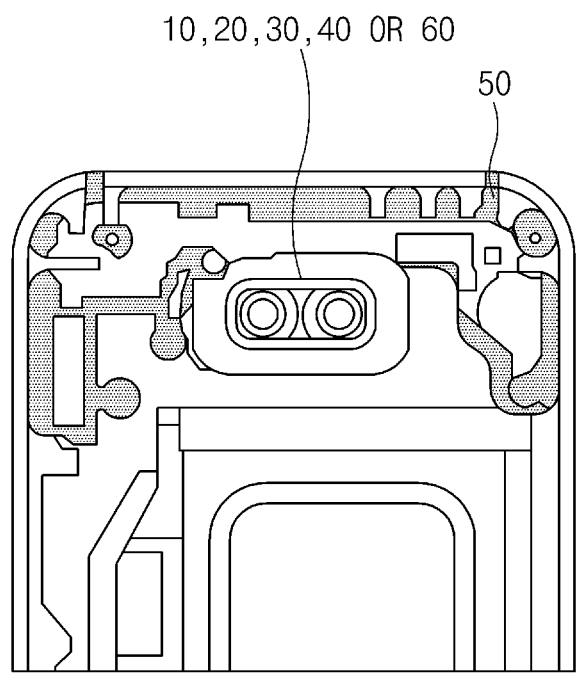
FIG. 5A and FIG. 5B are views illustrating an electronic device, to which a dual camera lens assembly is applied, according to various embodiments of the present disclosure.
Figure 5B:
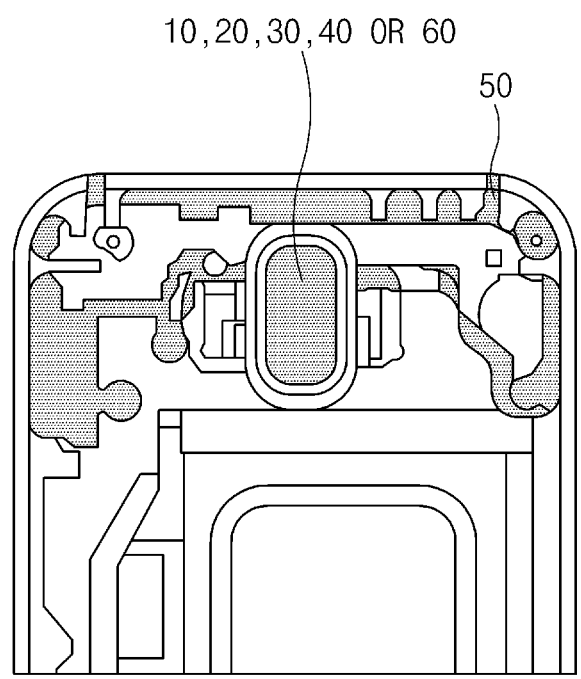

FIGS. 5A and 5B are views illustrating an electronic device, to which a dual camera lens assembly is applied, according to embodiments of the present disclosure.

As illustrated in FIG. 5A, the dual camera lens assembly 10, 20, 30, 40 or 60 according to the embodiments of the present disclosure may be configured such that two lens group units are transversely disposed on a rear surface of the electronic device 50.

Further, as illustrated in FIG. 5B, the dual camera lens assembly 10, 20, 30, 40 or 60 according to the embodiments of the present disclosure may be configured such that two lens group units are longitudinally disposed along a rear surface of the electronic device 50. As illustrated in FIG. 5B, two lens group units are transversely disposed and including an asynchronous structure, as previously seen in certain embodiments of the various embodiments of the present disclosure. In these cases, there may be a restriction in the disposition or placement of the battery (or a structure receiving disposition of the battery) on the rear surface of the electronic device 50 or a USIM. Hereinafter, the dual camera lens assembly according to the various embodiments of the present disclosure, which may address the restrictions, as will be described with reference to FIGS. 6A to 6C.

Figure 6A:
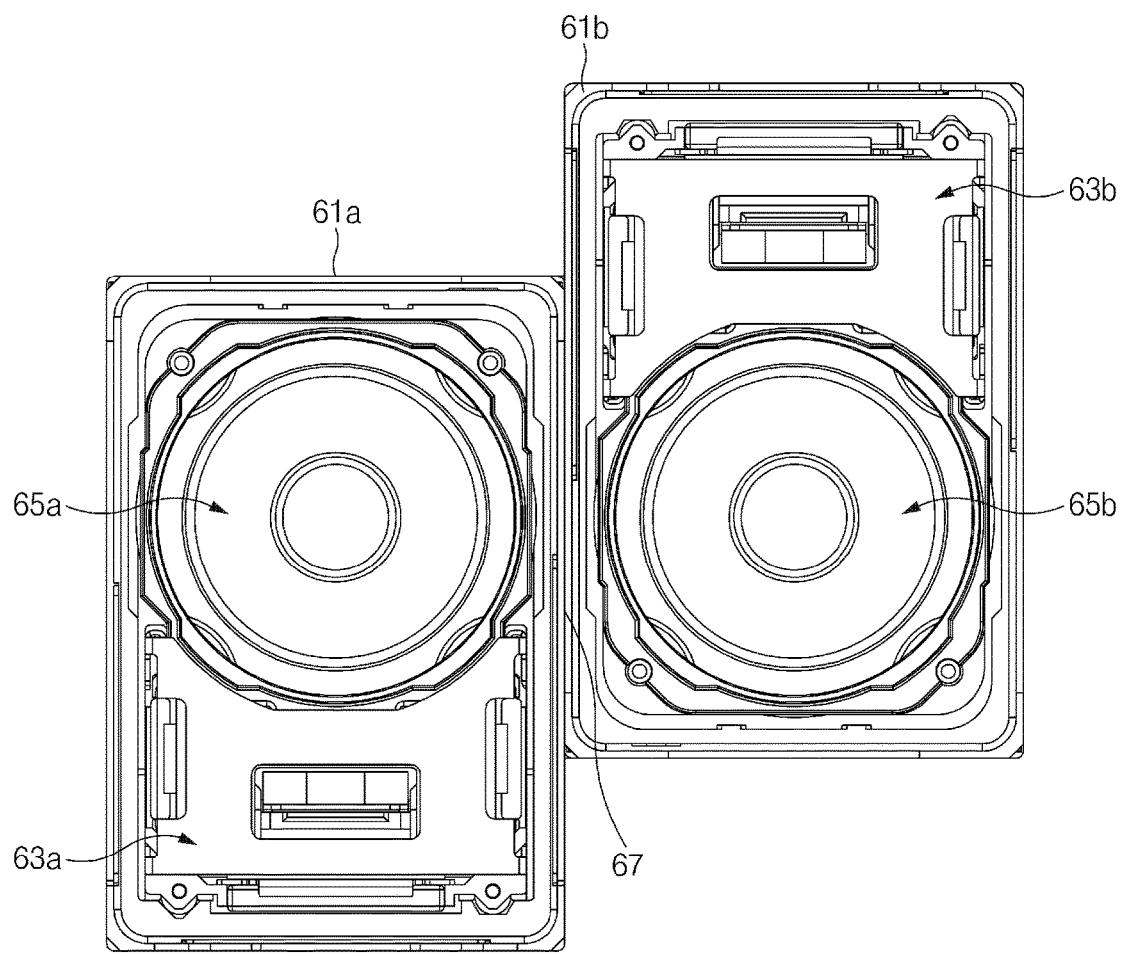
FIG. 6A is a view illustrating a dual camera lens assembly when viewed from the top according to various embodiments of the present disclosure.
Figure 6B:
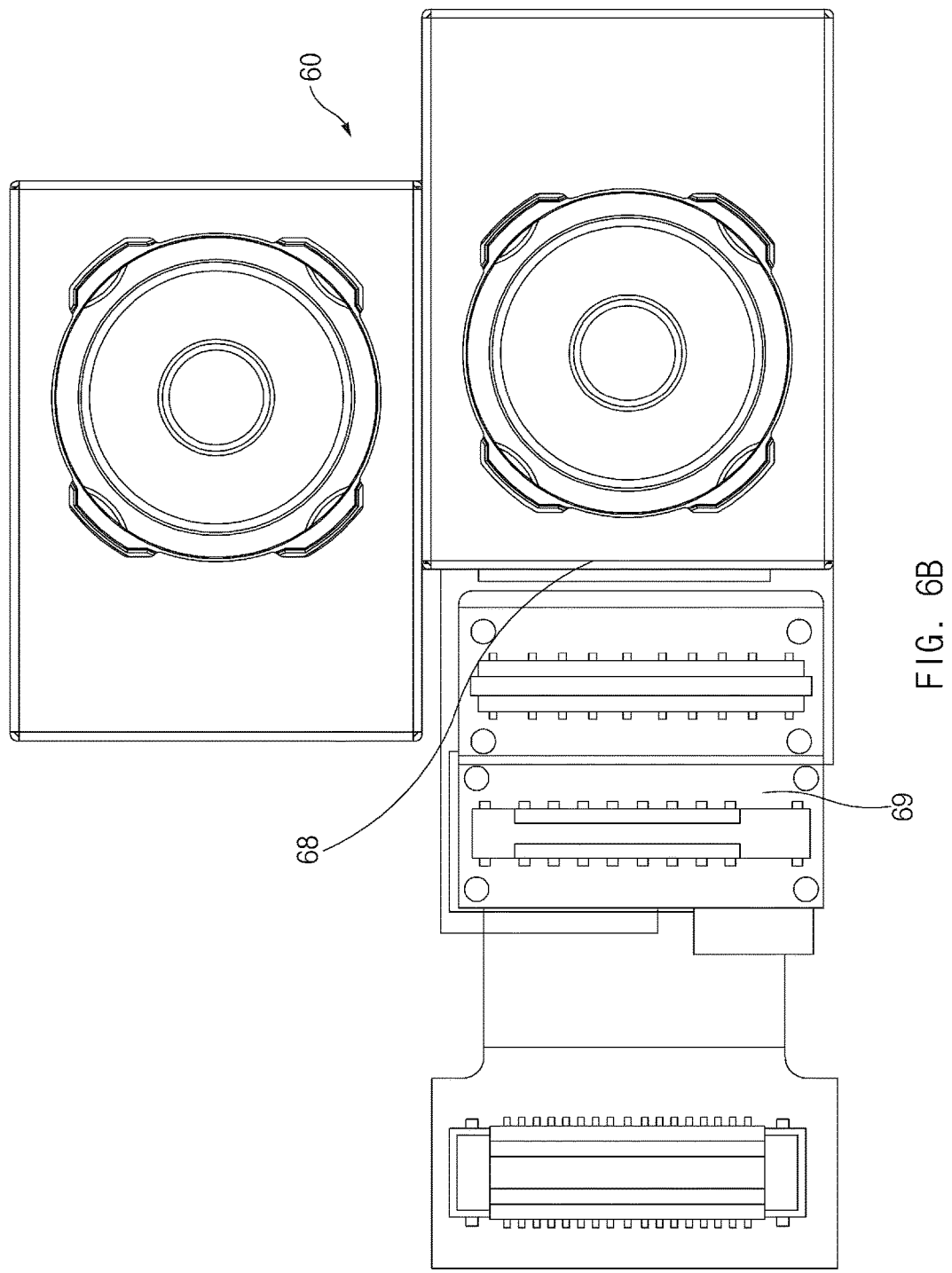
FIG. 6B is a view illustrating a coupling structure of the dual camera lens assembly according to various embodiments of the present disclosure.
Figure 6C:
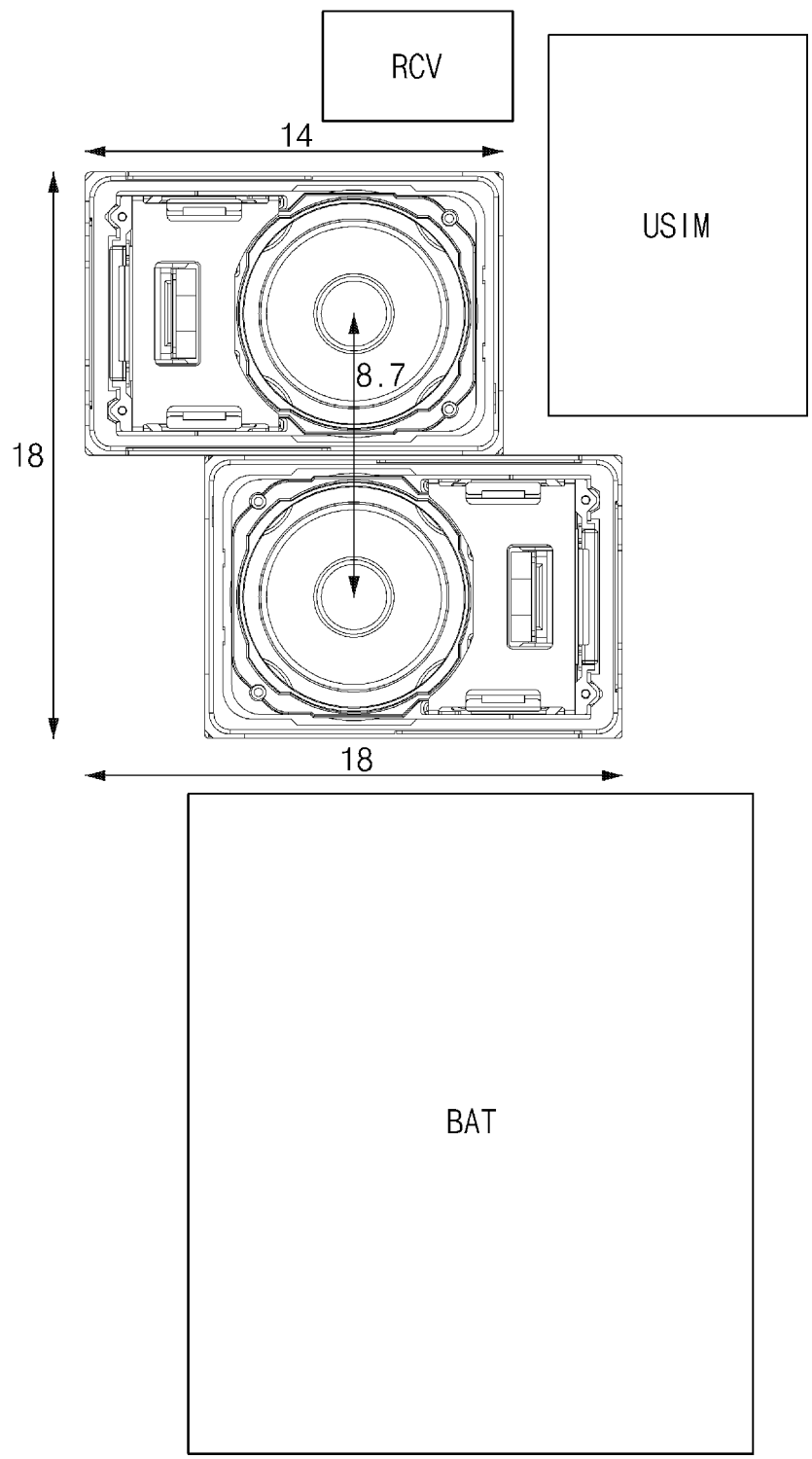
FIG. 6C is a view illustrating a peripheral circuit of the dual camera lens assembly according to various embodiments of the present disclosure.

FIG. 6A is a view illustrating a dual camera lens assembly when viewed from the top according to a various embodiments of the present disclosure. FIG. 6B is a view illustrating a coupling structure of the dual camera lens assembly according to the various embodiments of the present disclosure. FIG. 6C is a view illustrating a peripheral circuit of the dual camera lens assembly according to the various embodiments of the present disclosure.

As illustrated in FIG. 6A, the dual camera lens assembly 60 according to the various embodiments of the present disclosure differs from the various embodiments of the present disclosure in view of the disposition structure of the two camera lens assemblies. Hereinafter, the components of the dual camera lens assembly 60 according to the various embodiments of the present disclosure, which differs from the various embodiments of the present disclosure will be mainly described. In FIG. 6A, the dual camera lens assembly 60 may include at least one housing 61*a* and 61*b*, two driving modules 63*a* and 63*b*, and two lens group units 65*a* and 65*b*. In the following description, each of the camera lens assemblies may include a driving module 63*a* or 63*b* and one lens group unit 65*a* or 65*b*.

According to the various embodiments of the present disclosure, the housing 61*a* and 61*b* that accommodates the two camera lens assemblies may be one housing or a plurality of housings that contact each other. As an embodiment, when the housing 61*a* and 61*b* includes a plurality of housings, the plurality of housings 61*a* and 61*b* may be configured such that the two driving modules 63*a* and 63*b* contact the left and right sides of the base line so as to not face each other when the two lens group units 65*a* and 65*b* contact each other. For example, the two housings may have rectangular shapes, and may be arranged to contact each other such that the two lens units 65*a* and 65*b* are disposed at gap wall (or portions) 67 of the two housings contacting each other, and the two driving modules 63*a* and 63*b* are located at portions of the two housings, which do not contact each other.

As an embodiment, when the housing 61*a* and 61*b* includes one housing, the housing 61*a* and 61*b* may be configured such that the two driving modules 63*a* and 63*b* contact the left and right sides of the base line, so as to not face each other when the two lens group units 65*a* and 65*b* contact each other. For example, the one housing 61*a* and 61*b* may have a certain shape allowing one of the two rectangular areas contacting each other to be skewed relative to the other. One housing 61*a* and 61*b* may have a gap wall 67 on one surface of the two rectangular areas contacting, or may not have a gap wall 67. Two lens group units 65*a* and 65*b* may be disposed in parallel at portions of the rectangular areas of the one housing 61*a* and 61*b*, and two driving modules 63*a* and 63*b* may be disposed at the other portions of the rectangular areas, which when disposed according to this alignment or configuration do not contact each other.

As illustrated in FIG. 6B, in the dual camera lens assembly 60 according to the various embodiments of the present disclosure, a base line may be longitudinally disposed and an interface member 69 connected to an external circuit may be provided on a side surface 68 of one of the two lens group units 65*a* and 65*b*, which faces the driving module 63*a* or 63*b*.

As illustrated in FIG. 6C, the dual camera lens assembly 60 according to the various embodiments of the present disclosure may reduce a maximum length of the housing 61*a* and 61*b* as compared with the dual camera lens assembly 40 according to the various embodiments of the present disclosure. Accordingly, when the electronic device 50 is disposed, the dual camera lens assembly 60 may be beneficial in view of the disposition structure of a peripheral circuit. For example, the peripheral circuit may be a USIM, a receiver RCV, or a battery BAT.

Figure 7:
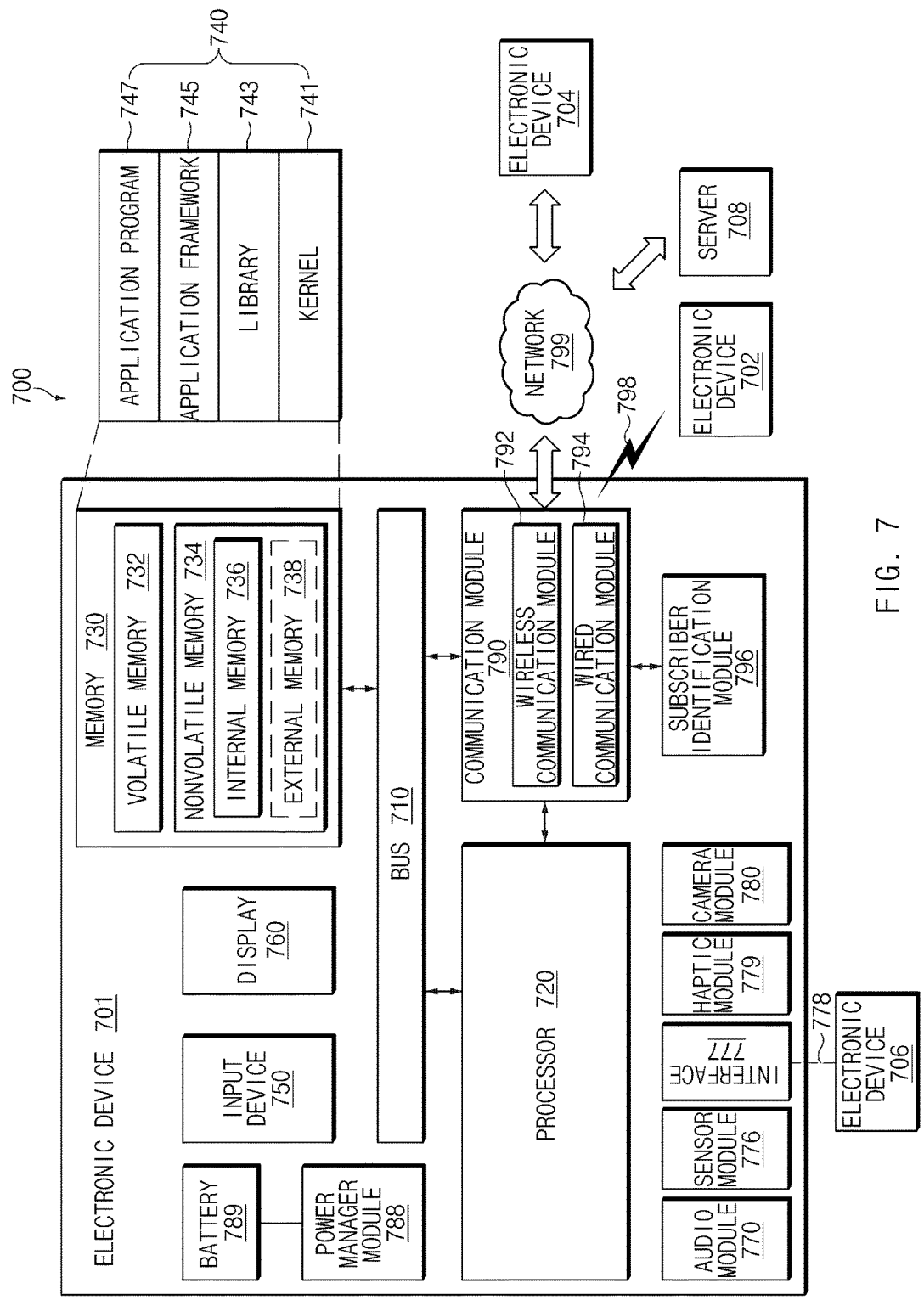
FIG. 7 is a block diagram of an electronic device in a network environment according to various embodiments of the present disclosure.

FIG. 7 illustrates an electronic device 701 in a network environment 700, according to various embodiments.

According to various embodiments disclosed in the present disclosure, the electronic device 701 may include various types of devices. For example, the electronic device 701 may include at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer, a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audios, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may complexly provide functions of multiple devices. In the present disclosure, the term "user" used herein may refer to a person who uses the electronic device or may refer to a device (e.g., an artificial intelligence electronic device) that uses the electronic device.

Referring to FIG. 7, under the network environment 700, the electronic device 701 (e.g., an electronic device) may communicate with an electronic device 702 through local wireless communication 798 or may communication with an electronic device 704 or a server 708 through a network 799. According an embodiment, the electronic device 701 may communicate with the electronic device 704 through the server 708.

According to an embodiment, the electronic device 701 may include a bus 710, a processors 720 (e.g., a processor) a memory 730, an input device 750 (e.g., a microphone or a mouse), a display 760, an audio module 770, a sensor module 776, an interface 777, a haptic module 779, a camera module 780, a power management module 788, a battery 789, a communication module 790, and a subscriber identification module 796. According to an embodiment, the electronic device 701 may not include at least one (e.g., the display 760 or the camera module 780) of the above-described elements or may further include other element(s).

For example, the bus 710 may interconnect the above-described elements 720 to 790 and may include a circuit for conveying signals (e.g., a control message or data) between the above-described elements. The processor 720 may include one or more of a central processing unit (CPU), an application processor (application), a graphic processing unit (GPU), a camera image signal processor (ISP) of a camera or a communication processor (CP). According to an embodiment, the processor 720 may be implemented with a system on chip (Soc) or a system in package (SiP). For example, the processor 720 may drive an operating system (OS) or an application to control at least one of another element (e.g., hardware or software element) connected to the processor 720 and may process and compute various data. The processor 720 may load an instruction or data, which is received from at least one of other elements (e.g., the communication module 790), into a nonvolatile memory 734 to process the instruction or data and may store the process result data into the nonvolatile memory 734.

The memory 730 may include, for example, a volatile memory 732 or a nonvolatile memory 734. The nonvolatile memory 734 may include, for example, a random access memory (RAM) (e.g., a dynamic random access memory (DRAM), a static RAM (SRAM), or a synchronous dynamic RAM (SDRAM)). The nonvolatile memory 734 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 734 may be configured in the form of an internal memory 736 or the form of an external memory 738 which is available through connection if desirable, according to the connection forms of the electronic device 701. The external memory 738 may further include a flash drive such as compact flash (CF), secure digital (SD), micro secure digital (Micro-SD), mini secure digital (Mini-SD), extreme digital (xD), a multimedia card (MMC), or a memory stick. The external memory 738 may be operatively or physically connected with the electronic device 701 in a wired manner (e.g., a cable or a universal serial bus (USB)) or a wireless (e.g., Bluetooth) manner.

For example, the memory 730 may store, for example, at least one different software element, such as an instruction or data associated with the program 740, of the electronic device 701. The program 740 may include, for example, a kernel 741, a library 743, an application framework 745 or an application program (interchangeably, "application") 747.

The input device 750 may include a microphone, a mouse, or a keyboard. According to an embodiment, the keyboard may include a keyboard physically connected or a keyboard virtually displayed through the display 760.

The display 760 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display.

The hologram device may show a stereoscopic image in a space using interference of light. The projector may project light onto a screen to display an image. The screen may be located inside or outside the electronic device 701.

The audio module 770 may convert, for example, from a sound into an electrical signal or from an electrical signal into the sound. According to an embodiment, the audio module 770 may acquire sound through the input device 750 (e.g., a microphone) or may output sound through an output device (not illustrated) (e.g., a speaker or a receiver) included in the electronic device 701, an external electronic device (e.g., the electronic device 702 (e.g., a wireless speaker or a wireless headphone)) or an electronic device 706 (e.g., a wired speaker or a wired headphone) connected with the electronic device 701.

The sensor module 776 may measure or detect, for example, an internal operating state (e.g., power or temperature) or an external environment state (e.g., an altitude, a humidity, or brightness) of the electronic device 701 to generate an electrical signal or a data value corresponding to the information of the measured state or the detected state. The sensor module 776 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 776 may further include a control circuit for controlling at least one or more sensors included therein. According to an embodiment, the sensor module 776 may be controlled by using the processor 720 or a processor (e.g., a sensor hub) separate from the processor 720. In the case that the separate processor (e.g., a sensor hub) is used, while the processor 720 is a sleep state, the separate processor may operate without awakening the processor 720 to control at least a portion of the operation or the state of the sensor module 776.

According to an embodiment, the interface 777 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 778 may physically connect the electronic device 701 and the electronic device 706. According to an embodiment, the connector 778 may include, for example, an USB connector, an SD card/MMC connector, or an audio connector (e.g., a headphone connector).

The haptic module 779 may convert an electrical signal into mechanical stimulation (e.g., vibration or motion) or into electrical stimulation. For example, the haptic module 779 may apply tactile or kinesthetic stimulation to a user. The haptic module 779 may include, for example, a motor, a piezoelectric element, or an electric stimulator.

The camera module 780 may capture, for example, a still image and a moving picture. According to an embodiment, the camera module 780 may include at least one lens (e.g., a wide-angle lens and a telephoto lens, or a front lens and a rear lens), an image sensor, an image signal processor, or a flash (e.g., a light emitting diode or a xenon lamp).

The power management module 788, which is to manage the power of the electronic device 701, may include at least a portion of a power management integrated circuit (PMIC).

The battery 789 may include a primary cell, a secondary cell, or a fuel cell and may be recharged by an external power source to supply power at least one element of the electronic device 701.

The communication module 790 may establish a communication channel between the electronic device 701 and an external device (e.g., the first external electronic device 702, the second external electronic device 704, or the server 708). The communication module 790 may support wired communication or wireless communication through the established communication channel. According to an embodiment, the communication module 790 may include a wireless communication module 792 or a wired communication module 794. The communication module 790 may communicate with the external device (e.g., the first external electronic device 702, the second external electronic device 704 or the server 708) through a first network 798 (e.g. a wireless local area network such as Bluetooth or infrared data association (IrDA)) or a second network 799 (e.g., a wireless wide area network such as a cellular network) through a relevant module among the wireless communication module 792 or the wired communication module 794.

The wireless communication module 792 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the present disclosure, "GPS" and "GNSS" may be interchangeably used.

According to an embodiment, when the wireless communication module 792 supports cellar communication, the wireless communication module 792 may, for example, identify or authenticate the electronic device 701 within a communication network using the subscriber identification module (e.g., a SIM card) 796. According to an embodiment, the wireless communication module 792 may include the processor 720 (e.g., an application processor (AP) and a separate communication processor (CP). In this case, the communication processor may perform at least a portion of functions associated with at least one of elements 710 to 796 of the electronic device 701 in substitute for the processor 720 when the processor 720 is in an inactive (sleep) state, and together with the processor 720 when the processor 720 is in an active state. According to an embodiment, the wireless communication module 792 may include a plurality of communication modules, each supporting a relevant communication scheme among cellular communication, short-range wireless communication, or a GNSS communication scheme.

The wired communication module 794 may include, for example, include a local area network (LAN) service, a power line communication, or a plain old telephone service (POTS).

For example, the first network 798 may employ, for example, WiFi direct or Bluetooth for transmitting or receiving instructions or data through wireless direct connection between the electronic device 701 and the first external electronic device 702. The second network 799 may include a telecommunication network (e.g., a computer network such as a LAN or a WAN, the Internet or a telephone network) for transmitting or receiving instructions or data between the electronic device 701 and the second electronic device 704.

According to embodiments, the instructions or the data may be transmitted or received between the electronic device 701 and the second external electronic device 704 through the server 708 connected with the second network. Each of the external first and second external electronic devices 702 and 704 may be a device of which the type is different from or the same as that of the electronic device 701. According to various embodiments, all or a part of operations that the electronic device (801 will perform may be executed by another or a plurality of electronic devices (e.g., the electronic devices 702 and 704 or the server 708. According to an embodiment, in the case that the electronic device 701 executes any function or service automatically or in response to a request, the electronic device 701 may not perform the function or the service internally, but may alternatively or additionally transmit requests for at least a part of a function associated with the electronic device 701 to another device (e.g., the electronic device 702 or 704 or the server 708). The another electronic device (e.g., the electronic device 702 or 704 or the server 708) may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device (e.g. 730).

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 720, may cause the one or more processors to perform a function corresponding to the instruction. The computer-readable storage media, for example, may be the memory 730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

According to various embodiments of the present disclosure, the electronic device may secure flexibility in view of the disposition structure of a peripheral circuit by reducing a maximum length of the housings of the two camera lens assemblies while reducing magnetic interferences for providing an automatic focusing function and anti-shake functionality.

According to various embodiments of the present disclosure, magnetic interferences may be reduced in the dual camera lens assembly.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
  a first camera module; and
  a second camera module,
  wherein the first camera module includes:
    a first image sensor;
    a first lens unit formed on the first image sensor and including a first side surface, a second side surface, a third side surface, and a fourth side surface;
    a first driving unit comprising a first coil and a first magnet which are disposed on the first side surface, wherein the first coil and the first magnet are configured to drive the first lens unit along a direction of an optical axis of the first lens unit; and a second driving unit comprising a second coil and a second magnet which are disposed on the second side surface and a third coil and a third magnet which are disposed on the third side surface, wherein the second coil and the second magnet are configured to drive the first lens unit along a first direction which is perpendicular to the optical axis of the first lens unit, and wherein the third coil and the third magnet are configured to drive the first lens unit along a second direction which is perpendicular to the optical axis of the first lens unit and the first direction, wherein the second camera module includes:
a second image sensor;
a second lens unit formed on the second image sensor and including a fifth side surface, a sixth side surface, a seventh side surface, and an eighth side surface;
a third driving unit comprising a fourth coil and a fourth magnet which are disposed on the fifth side surface, wherein the fourth coil and the fourth magnet are configured to drive the second lens unit along a direction of an optical axis of the second lens unit; and
a fourth driving unit comprising a fifth coil and a fifth magnet which are disposed on the sixth side surface and a sixth coil and a sixth magnet which are disposed on the seventh side surface, wherein the fifth coil and the fifth magnet are configured to drive the second lens unit along a third direction that is perpendicular to the optical axis of the second lens unit, and wherein the sixth coil and the sixth magnet are configured to drive the second lens unit along a fourth direction which is perpendicular to the optical axis of the second lens unit and the third direction, and wherein a side surface of the first camera module corresponding to the fourth side surface of the first lens unit is adjacent to a side surface of the second camera module corresponding to the eighth side surface of the second lens unit, and the driving units for driving the first lens unit and the second lens unit are disposed away from the fourth side surface and the eighth side surface.

2. The electronic device of claim 1, wherein the first lens unit includes an angle of view wider than that of the second lens unit.

3. The electronic device of claim 1, wherein at least one yoke is mounted on at least one surface of the first driving unit and the third driving unit.

4. The electronic device of claim 1, wherein the third driving unit is disposed along a same direction as the first driving unit.

5. The electronic device of claim 1, wherein the third driving unit is disposed facing the first driving unit.

6. The electronic device of claim 1, wherein each of the first driving unit and the third driving unit further includes at least one guide member and bearings,
wherein the at least one guide member transmits force generated by the first driving unit and the third driving unit to the first lens unit and the second lens unit,
wherein the first lens unit and the second lens unit move forwards and rearwards along the optical axis of the first lens unit in response the force, and
wherein the bearings are configured to roll in grooves provided in the at least one guide member when the first lens unit and the second lens unit move forwards and rearwards along the direction corresponding to the optical axis of the first lens unit.

7. The electronic device of claim 1, wherein the second driving unit further includes at least one guide member and bearings,
wherein the at least one guide member transmits a driving power generated by the second driving unit to the first lens unit,
wherein the first lens unit moves forwards and rearwards along the optical axis of the first lens unit, and
wherein the bearings are disposed to roll in grooves provided in the at least one guide member when the first lens unit moves in the first direction or the second direction.

8. The electronic device of claim 1, wherein the first driving unit and the third driving unit are both configured to execute focusing on an external object.

9. The electronic device of claim 1, wherein the second driving unit and the fourth driving unit are configured to execute compensation for shaking during capture of an image.

10. An electronic device comprising:
a plurality of lens group units disposed as to face a same direction;
a plurality of driving modules provided respectively on first side surfaces of each of the plurality of lens group units to move each of the plurality of lens group units along a direction of a respective optical axis of each of the plurality of lens group units, or move each of the plurality of lens group units along a direction perpendicular to the respective optical axis of each of the plurality of lens group units; and
a housing at least partially enclosing at least some of the plurality of lens group units and the plurality of driving modules,
wherein each of the plurality of driving modules includes:
at least one first magnet configured to provide driving power along the direction of the respective optical axes of each of the plurality of driving modules;
at least two second magnets configured to provide driving power along a first direction that is perpendicular to each of the respective optical axes, or a second direction that is perpendicular to respective the optical axes and the first direction; and
a shield yoke disposed on at least one surface of the first magnet and the second magnet.

11. The electronic device of claim 10, wherein each of the plurality of driving modules includes:
an auto-focusing (AF) driving unit configured to move a corresponding lens group unit forwards and rearwards along a direction of a respective optical axis of the corresponding lens group unit; and
an optical image stabilizer (OIS) driving unit configured to move the corresponding lens group unit along a first direction or a second direction that is perpendicular to the respective optical axis of the corresponding lens group unit.

12. The electronic device of claim 11, wherein respective AF driving units of each of the plurality of driving modules are disposed along a respective base line connecting centers of each of the plurality of lens group units.

13. The electronic device of claim 11, wherein the respective AF driving units of each of the plurality of driving modules are disposed on left and right sides of a base line connecting centers of each the plurality of lens group units, so that two of the respective AF driving units are disposed facing away from one other.

14. The electronic device of claim 11, wherein each of the respective AF driving units of each of the plurality of driving modules includes:

at least one guide member and bearings,
the at least one guide member configured to transmit driving power generated by a corresponding AF driving unit to a corresponding lens group unit, and
wherein the bearings roll in grooves provided in the at least one guide member when the corresponding lens group unit moves forwards and rearwards along a direction of a corresponding optical axis of the corresponding lens group unit.

15. The electronic device of claim 10, wherein each of the OIS driving units of each of the plurality of driving modules includes:
at least one guide member and bearings,
wherein the at least one guide member is configured to transmit driving power generated by a corresponding OIS driving unit to a corresponding lens group unit, and
wherein the bearings roll in grooves provided in the at least one guide member when a corresponding lens group unit moves along a first direction or a second direction that is perpendicular to a corresponding optical axis of the corresponding lens group unit.

16. The electronic device of claim 10, wherein each of the plurality of driving modules includes:
at least one first coil contacting and facing the at least one magnet providing an electromagnetic force for forward and rearward movement of each of the plurality of lens group units along the direction of each of the respective optical axes through an interaction with the first magnet, if an electric voltage is applied to the at least one first coil;
at least one second coil contacting and facing the at least two second magnets providing an electromagnetic force for movement of each of the plurality of lens group units along the first direction or the second direction through an interaction with the second magnet, if an electric voltage is applied to the at least one second coil; and
a suction yoke contacting the at least one first coil and the at least one second coil.

17. The electronic device of claim 10, wherein the housing comprises:
a photographing area disposed at an upper end of a printed circuit board, and including a plurality of image sensors configured to photograph an image in association with the plurality of lens group units; and
a driving area provided with the plurality of driving modules,
wherein the printed circuit board includes a gap disposed under the driving area of the housing, the gap corresponding to a side surface of the printed circuit board that is cut away.

* * * * *